(12) United States Patent
Miyazaki et al.

(10) Patent No.: US 6,570,351 B2
(45) Date of Patent: May 27, 2003

(54) SENSORLESS MOTOR DRIVING APPARATUS

(75) Inventors: Shinichi Miyazaki, Suwa (JP); Akihiko Ikegami, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/040,976

(22) Filed: Jan. 8, 2002

(65) Prior Publication Data

US 2002/0171381 A1 Nov. 21, 2002

(30) Foreign Application Priority Data

Mar. 26, 2001 (JP) ........................................ 2001-088846

(51) Int. Cl.[7] .............................................. H02K 23/00
(52) U.S. Cl. ...................... 318/254; 318/138; 318/439
(58) Field of Search ................................ 318/254, 138, 318/439, 700, 701, 696; 388/800

(56) References Cited

U.S. PATENT DOCUMENTS

| | | | |
|---|---|---|---|
| 5,245,359 A | 9/1993 | Ito et al. | |
| 5,466,999 A | 11/1995 | Hutsell | |
| 5,747,971 A * | 5/1998 | Rozman et al. | 322/10 |
| 5,920,162 A * | 7/1999 | Hanson et al. | 318/254 |
| 6,075,332 A * | 6/2000 | McCann | 318/432 |
| 6,483,266 B2 * | 11/2002 | Miyazaki et al. | 318/254 |

FOREIGN PATENT DOCUMENTS

| | | |
|---|---|---|
| EP | 0 670 627 | 9/1995 |
| EP | 1 020 987 | 7/2000 |

OTHER PUBLICATIONS

European Search Report for Application No. 01122585.1.

* cited by examiner

*Primary Examiner*—Karen Masih
(74) *Attorney, Agent, or Firm*—Harness, Dickey & Pierce, P.L.C.

(57) ABSTRACT

When a rotor of a brushless motor 1 is at rest, excitation is performed three times such that excitation phase is switched each time an excitation is performed thereby to ensure that the rotor rotates. When the rotor has stopped after the third excitation, a commutation reference point is set at the rest position. A position detector outputs pulses in response to movement of an object driven by the brushless motor. The pulses output from the position detector are monitored and commutation is controlled on the basis of the number of pulses as counted starting from the commutation reference point. For example, the number of pulses output during a period starting from the commutation reference point and ending at a point of time at which commutation should be performed is measured as a predetermined number in advance. When the counted number of pulses with respect to the commutation reference point becomes equal to the above predetermined number, it is determined that a commutation timing has reached, and commutation is performed.

15 Claims, 13 Drawing Sheets

SENSORLESS MOTOR DRIVING APPARATUS

FIELD OF THE INVENTION

The present invention relates to a sensorless motor driving apparatus for driving a sensorless motor such as a brushless DC motor or a stepper motor by switching an excited phase in accordance with the position of a rotor, and more particularly, to a sensorless motor driving apparatus which controls commutation of the sensorless motor using a position detector for detecting the position of an object driven by the sensorless motor.

DESCRIPTION OF THE RELATED ART

In the prior art of motors using a permanent magnet on the rotor, such as brushless DC motors or HB-type stepper motors, it is known to detect the position of the rotor by detecting a counter electromotive voltage induced in a non-exciting phase (phase in which no current flows) of the stator coil. That is, the counter electromotive voltage induced in a non-exciting coil is monitored, and the position of the rotor is detected by detecting a zero-crossing point at which the counter electromotive voltage crosses a neutral voltage point. In this technique, commutation is performed, for example, at a point at which the phase is shifted by 30° with respect to the zero-crossing point.

However, in this technique, when the rotor is at rest, no counter electromotive voltage is induced in the stator coil and thus sensorless driving is impossible. Therefore, when the motor whose rotor is at rest is started, the rotor is forcedly driven by performing forced commutation, and the operation is switched into a sensorless driving mode when the rotation speed has become high enough to induce a counter electromotive voltage greater than a predetermined value in the stator coil.

Besides, the above sensorless control method, it is also known to provide a Hall device on a motor whereby the position of the rotor is detected thereby controlling the motor.

However, in the sensorless control on the basis of the counter electromotive voltage, commutation cannot be controlled in a low-speed range as described above, and thus this technique is unsuitable when the motor is frequently started and stopped. On the other hand, when a Hall device is used to control commutation, although control is possible in a low-speed range, the control accuracy is limited by factors such as a limited accuracy in the width of magnetic poles of the rotor and an installation position error of the Hall device, and thus the accuracy of controlling commutation is poorer than that obtained by the sensorless control on the basis of the counter electromotive voltage in a high-speed range in which the counter electromotive voltage can be detected. Thus, there is a need for a sensorless control method which allows a motor to be controlled precisely even in a low-speed range.

SUMMARY OF THE INVENTION

In view of the above problems in the conventional techniques, it is an object of the present invention to provide an apparatus for driving a sensorless motor, capable of controlling commutation in a precise and highly reliable fashion even in a low-speed range.

To achieve the above object, there is provided an apparatus for driving a sensorless motor, comprising: a position detector for outputting a pulse signal in response to a movement of an object driven by a sensorless motor; commutation control means which counts a number of pulses of the pulse signal output from the position detector and controls the commutation of the sensorless motor depending upon the count value; commutation reference point setting means for setting a commutation reference point employed as a reference point in the counting of the pulses; wherein, each time the sensorless motor is started for the first time after the apparatus has been turned on, the commutation reference point setting means performs a first and a second phase excitation such that a first pulled-in position resulting from the first phase excitation and a second pulled-in position resulting from the secondphase excitation become different in electrical angle from each other by a magnitude not equal to either 180° or an integral multiple of 180°, and the commutation reference point setting means further performs third-phase excitation such that a third pulled-in position resulting from the third-phase excitation becomes different in electrical angle from the second pulled-in position by a magnitude not equal to either 180° or an integral multiple of 180°, and, thereafter, the commutation reference point setting means performs the setting of the commutation reference point when a rotor of the sensorless motor has stopped after the third-phase excitation.

When the object driven by the sensorless motor moves, a pulse signal is output from the position detector in response to the movement of the object, and the commutation is controlled on the basis of the counted number of pulses of the pulse signal. The commutation reference point, which is used as a reference point in counting the number of pulses of the pulse signal, is set by the commutation reference point setting means on the basis of a position (pulled-in position) at which the rotor stops when a stator coil of the sensorless motor is excited.

In the case where excitation is performed only once, there is a possibility that, depending upon the position at which the rotor is at rest just before the sensorless motor is started for the first time, the rotor does not move in response to the excitation. However, if excitation is performed twice such that the pulled-in positions become different in electrical angle from each other by a magnitude not equal to either 180° or an integral multiple of 180°, the rotor surely rotates in the forward or reverse direction and is pulled into the second-pulled-in position. If further excitation is performed such that the pulled-in position resulting from the third phase excitation becomes different in electrical angle from that of the pulled-in position resulting from the second-phase excitation by a magnitude not equal to either 180° or an integral multiple of 180°, the rotor rotates in a desired rotational direction and is pulled into the third-pulled-in position.

If the commutation reference point is set at the position at which the rotor is at rest after being pulled-in by the third excitation, then the resultant commutation reference point becomes coincident with the position at which commutation should be performed during rotation in the specified rotational direction.

Therefore, if this commutation reference point is employed as a counting reference point, and if the pulses are counted with respect to this reference point, and commutation is performed each time the count value becomes equal to an integral multiple of a predetermined number of pulses per commutation interval, commutation is correctly performed whenever the rotor comes to a position at which commutation should be performed.

In the case where an object is driven by the sensorless motor via a mechanism including, for example, a gear transmission mechanism, transmission belt, and pulley, there is a possibility that the object driven by the sensorless motor does not move and thus no pulse signal is output from the position detector, although the rotor actually rotates. This can occur if the gear transmission mechanism has backlash or if the driving force transmission belt expands. As a result, a shift occurs between the actual amount of rotation of the rotor from the rest position and the amount of rotation calculated from the number of pulses which are output from the position detector in response to the rotation.

In the present invention, the above problem is avoided by rotating the rotor in a desired rotational direction by performing excitation three times and then setting the commutation reference point at the pulled-in position where the rotor has stopped after the third excitation. Thus, if, thereafter, the sensorless motor is started in the same rotational direction as that in which the rotor was rotated to the position where the commutation reference point was set, the commutation reference point provides the correct counting reference point with no influence of the backlash. Therefore, it is able to control the commutation with correct timings.

The invention also provides a sensorless motor driving apparatus, wherein the commutation reference point setting means sets the commutation reference point for each rotational direction of the sensorless motor, and wherein the commutation control means controls the commutation depending upon the respective rotational direction in accordance with the number of pulses as counted starting from the commutation reference point set for that respective direction.

The invention also provides a sensorless motor driving apparatus, wherein the commutation reference point setting means detects an offset value indicating the number of pulses corresponding to the difference in position between the commutation reference points set for the respective rotational directions of the sensorless motor, and wherein the commutation control means counts the pulses with respect to one of the commutation reference points and corrects the count value of pulses on the basis of the offset value each time the rotational direction is switched.

Commutation reference points are set separately for the respective rotational directions of the sensorless motor. In the case where an object is driven by the sensorless motor via a mechanism including, for example, a gear transmission mechanism, a transmission belt, a pulley and/or a similar mechanical element, there is a possibility that, when the rotational direction is switched, the absolute position of the object to be driven is shifted with respect to the absolute position of the rotor, due to backlash of the gear transmission mechanism or expansion of the transmission belt. When there is such a shift, if commutation is controlled on the basis of the count value of pulses with respect to one commutation reference point set for one rotational direction, commutation timings generated on the basis of the count value of pulses in the opposite direction become different from correct timings.

To avoid the above problem, commutation reference points are set for the respective rotational directions of the sensorless motor, and commutation is controlled, depending upon the actual direction, in accordance with the number of pulses as counted starting from a commutation reference point set for that actual direction, thereby preventing the commutation timings from shifting from the correct timings depending upon switching the rotational direction.

Herein, an offset value, which indicates the number of pulses corresponding to the difference in position between the commutation reference points set for the respective rotational directions of the sensorless motor, is detected, and the number of pulses is counted with respect to one of the commutation reference points and the count value of pulses is corrected on the basis of the offset value each time the rotational direction is switched so that the resultant count value of pulses represents a correct value with respect to the commutation reference point for the actual rotational direction. This makes it unnecessary to prepare counting variables for storing the count value of pulses for the respective rotational directions and switch the counting variable to be referred to each time the rotational direction is switched.

The invention also provides a sensorless motor driving apparatus further comprising counter electromotive force detection means for detecting a counter electromotive force induced in a non-exciting phase of the sensorless motor; and commutation timing generating means for generating a commutation timing in accordance with the counter electromotive force detected by the counter electromotive force detection means, wherein commutation reference point setting means resets the commutation reference point at a point of time of the commutation timing generated by the commutation timing generating means.

The invention also provides a sensorless motor driving apparatus wherein the commutation timing generating means generates a commutation timing in accordance with the counter electromotive force of one of the phases of the sensorless motor.

The counter electromotive force induced in the non-exciting phase, in which no current flows, of the sensorless motor is detected by the counter electromotive force detection means. The position of the rotor is detected on the basis of the detected counter electromotive force, and a commutation timing is generated on the basis of the detected position of the rotor. At a point of time indicated by the generated commutation timing, resetting of the commutation reference point is performed.

The accuracy of the position of the rotor detected on the basis of the counter electromotive force is better than the accuracy of the position of the rotor detected on the basis of the pulled-in position to which the rotor is pulled in by pulling-in excitation. That is, in the case where the rotor is pulled into a rest position by excitation, the rotor stops at a position slightly shifted from an electrical stable rest position, depending upon an external force such as a frictional force which is balanced with a torque generated by the motor. In contrast, the position of the rotor detected by the counter electromotive force does not include an error caused by the frictional force or the like.

In view of the above, when it becomes possible to generate a commutation timing on the basis of the counter electromotive force, the position of the rotor is detected more precisely on the basis of the counter electromotive force, and a commutation timing is generated on the basis of the detected position of the rotor, and resetting of the commutation reference point is performed. After the resetting of the commutation reference point, the number of pulses is counted with respect to the (reset) commutation reference point, and commutation is performed on the basis of the count value of pulses, and thus it is ensured that commutation is controlled more precisely.

In the conventional sensorless control technique on the basis of the counter electromotive force, it is necessary to sequentially detect the counter electromotive forces of all phases of the sensorless motor and generate commutation timings on the basis of the detected counter electromotive forces for all phases. In contrast, the commutation timing generating means generates commutation timings on the basis of the counter electromotive force not of all phases of the sensorless motor but of one of the phases, and thus the counter electromotive force can be detected using a smaller number of circuits, and the commutation timing can be generated by simpler processing.

The invention also provides a sensorless motor driving apparatus, wherein the commutation timing generating means generates a commutation timing for each rotational direction of the sensorless motor, and wherein the commutation reference point setting means resets the commutation reference points for the respective rotational directions in accordance with the corresponding commutation timings generated for the respective rotational directions.

The invention also provides a sensorless motor driving apparatus, wherein the commutation reference point setting means detects an offset value indicating the number of pulses corresponding to the difference in position between the commutation reference points reset in accordance with the commutation timings generated for the respective rotational directions by the commutation timing generating means, and wherein the commutation control means counts the pulses with respect to one of the commutation reference points and corrects the count value of pulses on the basis of the offset value each time the rotational direction is switched.

The invention also provides a sensorless motor driving apparatus further comprising storage means for storing the offset value, wherein the commutation control means corrects the count value of pulses in accordance with the offset value stored in the storage means.

The commutation reference point setting means resets the commutation reference points for the respective rotational directions on the basis of the commutation timings generated for the respective rotational directions by the commutation timing generating means. In the case where an object is driven by the sensorless motor via a mechanism including, for example, a gear transmission mechanism, a transmission belt, a pulley and/or a similar mechanical element, there is a possibility that, when the rotational direction is switched, the absolute position of the object to be driven is shifted with respect to the absolute position of the rotor, due to backlash of the gear transmission mechanism or expansion of the transmission belt. When there is such a shift, if commutation is controlled on the basis of the count value of pulses with respect to one commutation reference point set for one rotational direction, commutation timings generated on the basis of the count value of pulses in the opposite direction become different from correct timings.

The above problem is avoided because commutation timings are generated on the basis of the counter electromotive forces in the respective rotational directions, and resetting of the commutation reference points is performed for the respective rotational directions on the basis of the commutation timings generated, thereby preventing the commutation timings from shifting from the correct timings.

Herein, an offset value is detected which indicates the number of pulses corresponding to the difference in position between the commutation reference points set for the respective rotational directions of the sensorless motor. After resetting the commutation reference points, the number of pulses is counted with respect to one of the commutation reference points, and the count value of pulses is corrected on the basis of the offset value each time the rotational direction is switched, so that the corrected count value represents a correct value with respect to the commutation reference point for the actual rotational direction. This makes it unnecessary to prepare counting variables for storing the count value of pulses for the respective rotational directions and switch the counting variable to be referred to each time the rotational direction is switched.

The offset value is detected and stored in advance. This makes it unnecessary to detect the offset value each time the commutation reference point is reset on the basis of the commutation timing generated in accordance with the counter electromotive force.

The invention also provides a sensorless motor driving apparatus, wherein when the control of the sensorless motor is started, the commutation control means performs the resetting of a commutation reference point in accordance with a commutation timing generated by the commutation timing generating means.

The invention also provides a sensorless motor driving apparatus, wherein when a predetermined period of time has elapsed since the control of the sensorless motor was started, the commutation control means performs the resetting of a commutation reference point in accordance with a commutation timing generated by the commutation timing generating means.

The invention also provides a sensorless motor driving apparatus, wherein each time a predetermined period of time elapses after the control of the sensorless motor was started, the commutation control means performs the resetting of a commutation reference point in accordance with a commutation timing generated by the commutation timing generating means.

The invention also provides a sensorless motor driving apparatus, wherein each time the sensorless motor is started, the commutation control means performs the resetting of a commutation reference point in accordance with a commutation timing generated by the commutation timing generating means.

The resetting of the commutation reference point on the basis of the commutation timing generated by the commutation timing generating means is performed when the control of the sensorless motor is started, the commutation reference point can be reset as soon as the rotational speed of the sensorless motor becomes high enough to generate a commutation timing on the basis of the counter electromotive force. Therefore, the commutation reference point can be set precisely at an early stage after starting the control of the sensorless motor. If the resetting of the commutation reference point is performed when a predetermined period of time has elapsed since the control was started, more specifically, for example, if the resetting is performed when a change in ambient temperature, which occurs after the sensorless motor is started, has reached an equilibrium state, the resetting of the commutation reference point is performed under a stable condition in terms of the ambient temperature. Furthermore, if the resetting of the commutation reference point is performed each time a predetermined period of time elapses after the control is started, the commutation reference point is properly set depending upon a change in ambient temperature. Still furthermore, if the resetting of the commutation reference point is performed each time the sensorless motor is started, that is, each time the sensorless motor starts to rotate, so that the commutation reference point is correctly set depending upon the conditions when the sensorless motor is started.

DETAILED DESCRIPTION OF THE PREFERRED EMBODIMENTS

Embodiments of the present invention are described below with reference to the drawings.

A first embodiment of the present invention is first described below.

Figure 1:
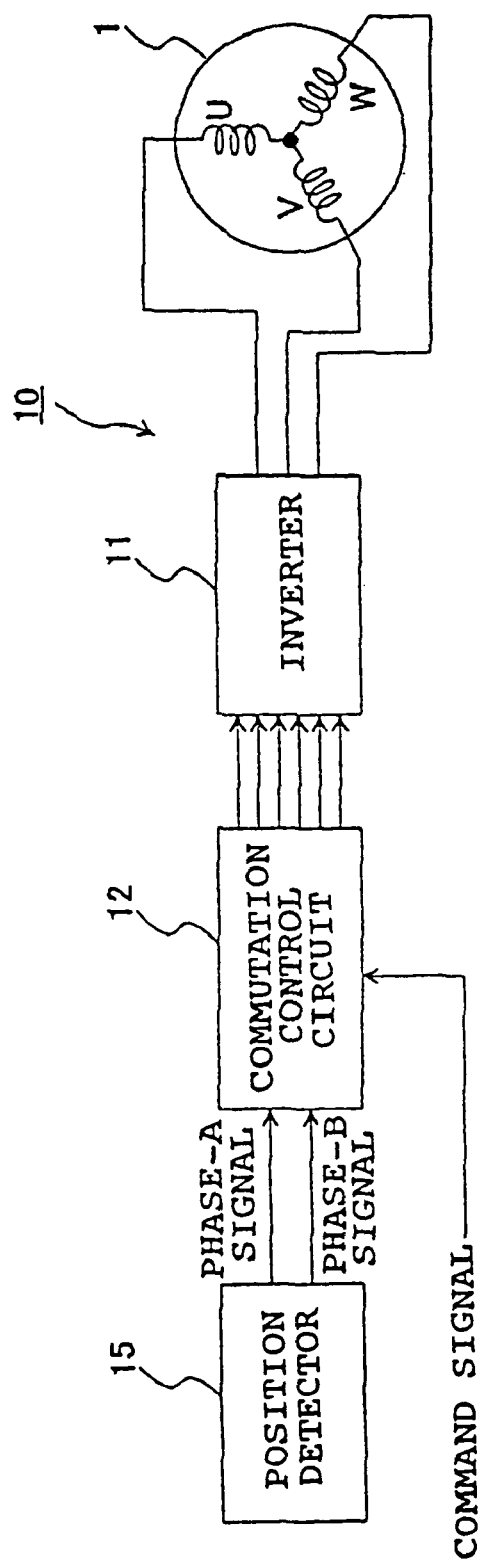
FIG. 1 is a schematic diagram of a brushless motor driving apparatus according to the present invention.

FIG. 1 is a schematic diagram of a driver circuit 10 for driving a brushless motor 1, according to the present invention.

The brushless motor 1 is a 3-phase brushless motor having three star-connected stator coils of phases U, V, and W. The driver circuit 10 includes an inverter 11, output terminals of which are connected to respective terminals of phases of U, V, and W of the brushless motor 1. The inverter 11 includes three pairs of transistors connected in a known manner to form three half-bridges, one for each phase. Each half-bridge is composed of a series connection of two transistors connected between a power source terminal and ground. The turning-on/off of the six transistors in the inverter is controlled by commutation signals supplied from a commutation control circuit 12 so that the respective phases of the brushless motor 1 are sequentially excited to rotate the rotor.

The rotary shaft of the brushless motor 1 is connected to, for example, a paper feed mechanism of a printer via a gear transmission mechanism, although they are not shown. When the brushless motor 1 rotates, the rotational force of the brushless motor 1 is transmitted via the gear transmission mechanism to a shaft of a paper feed roller in the paper feed mechanism thereby feeding paper. A position detector 15 such as a rotary encoder for detecting the angle of rotation of the roller shaft is disposed on the shaft of the paper feed roller.

The position detector 15 outputs two types of pulse signals with different phases A and B so that the rotational direction can be detected from the phase relationship between these two types of signals. The position detector 15 has a resolution high enough to generate a plurality of pulses per pulse signal during one commutation interval of the brushless motor 1.

The commutation control circuit 12 includes, for example, a microcomputer and a storage device (storage means) for storing data such as a commutation pulse sequence P which will be described later. The two types of detection signals output from the position detector 15 are applied to the commutation control circuit 12. The commutation control circuit 12 performs initial pulling-in excitation of the brushless motor 1 to set the initial value of a pulse count value C (counted number of pulses or pulse edges) depending upon the rotational direction so that the initial value of the pulse count value C serves as the reference point used in generating commutation timings.

The commutation control circuit 12 detects the rotational direction of the brushless motor 1 on the basis of the two types of pulse signals output from the position detector 15. The commutation control circuit 12 also detects all edges of one or both of the pulse signals (hereafter referred to as pulse edges) and counts the number of pulses or pulse edges (hereafter referred to as the numbers of pulses) in a particular manner depending upon the rotational direction such that the number of pulses is counted additively when the brushless motor 1 is rotated in the forward direction to drive the paper feed mechanism to feed paper, while the number of pulses is counted subtractively when the brushless motor 1 is rotated in the reverse direction. On the basis of the count value of pulses (pulse count value C) and the commutation pulse sequence P stored in the predetermined storage area, the commutation control circuit 12 generates commutation timings of the brushless motor 1.

The commutation control circuit 12 has a variable called commutation mode which numerically indicates which transistors of those of the inverter 11 should be turned on, i.e., each of the combinations of transistors to be turned on is assigned a unique numerical value. The commutation signals output by the commutation control circuit 12 have a one-to-one correspondence with the value of the commutation mode. In accordance with a rotational direction specified by a command signal received from a higher-level device (not shown), the value of the commutation mode is switched to the respective proper value in synchronization with the commutation timing (hereinafter, such switching will be referred to as switching of the commutation mode) so as to rotate the brushless motor 1 in the specified rotational direction. More specifically, the commutation signals corresponding to the commutation mode is applied to the inverter 11 thereby properly switching the excitation of the stator coils of the brushless motor 1 among phases U to W and thus rotating the brushless motor 1.

As in the known method of driving a brushless motor, the commutation control circuit 12 measures in real time the rotational speed and the angle of rotation of the shaft of the paper feed roller on the basis of the pulse signals output from the position detector 15 and superimposes a control signal such as a PWM signal upon the commutation signal thereby controlling the rotational speed and the angle of rotation of the shaft of the paper feed roller.

The commutation pulse sequence P is set as follows. For example, as is known in the art, a mid-point voltage of the counter electromotive voltage of each phase of the inverter 11 is detected, and commutation is performed at a point which is shifted by 30° from the mid-point voltage thereby rotating the brushless motor 1. During the rotation, the number of pulses output from the position detector 15 is counted over a plurality of commutation intervals, and the counted number of pulses is divided by the number of commutation intervals thereby calculating an interval pulse number M indicating the number of pulses per commutation interval output from the position detector 15.

Herein, the interval pulse number M is supposed to be a fractional number. For example, if the number of pulses counted over 5 commutation intervals is 102, then the interval pulse number M is $102/5$ (=20.4). In this specific case in which the interval pulse number M is equal to 20.4, the correct commutation timings are given when the number of pulses as counted starting from the initial commutation position of the rotor of the brushless motor 1 becomes equal to 20.4, 40.8, 61.2, 81.6, and so on, as shown in Table 1.

TABLE 1

| Commutation | 1st Time P1 | 2nd Time P2 | 3rd Time p3 | 4th Time P4 | 5th Time P5 |
|---|---|---|---|---|---|
| Rounded Interval pulse number M' Number of Pulses Per Interval | 20 | 21 | 20 | 21 | 20 |
| Cumulative Number of Pulses | 20 | 41 | 61 | 82 | 102 |
| Real Commutation Position value | 20.4 | 40.8 | 61.2 | 81.6 | 102 |
| Error | −0.4 | +0.2 | −0.2 | +0.4 | ±0 |

However, the cumulative number of pulses is an integer. Therefore, the number of pulses representing the correct commutation timing, that is, the real commutation position value is rounded to the nearest integer. The resultant integer is referred to herein as "cumulative number of pulses" that represent approximated commutation timing in terms of pulse counts. The difference between the cumulative numbers of pulses in adjacent commutation intervals is defined as rounded interval pulse number M'.

For example, at the first commutation timing, the real commutation position value is "20.4" in the real cumulative value of pulses, and this value is rounded to "20" which is the integer closest to "20.4". Thus the rounded cumulative number of pulses corresponding to the first commutation timing is chose to "20", and the rounded interval pulse number M' is also chosen to "20". Thus, the difference between the real commutation position value and the rounded cumulative number of pulses is "−0.4". Similarly, at the second commutation timing, the real commutation position value is "40.8" in the real cumulative value of pulses, and thus the rounded cumulative number of pulses is set to "41" and the rounded interval pulse number M' is "21". In this case, the difference between the real commutation position value and the rounded cumulative number of pulses is "+0.2". At the third and fourth commutation timings, the values are determined in a similar manner. At the fifth commutation timing, the real commutation position value is "102". In this case, the real commutation position value is an integer, and thus this value is directly employed as the rounded cumulative number of pulses, and the rounded interval pulse number M' is "20". As a result, at the fifth commutation timing, the error between the rounded cumulative number of pulses and the real commutation position value becomes "±0".

At the following sixth commutation timing, the real commutation position value becomes "122.4", and thus the rounded cumulative number of pulses becomes "122", and the rounded interval pulse number M' becomes "20". As a result, the error between the real commutation position value and the rounded cumulative number of pulses becomes "−0.4". Thus, the rounded interval pulse number M' and the error become the same as those at the first commutation timing. At the following commutation timings, these values are the same as those obtained at the second commutation timing and the timings following that. Thus, the rounded interval pulse number M' are given by a repetition of "21, 20, 21, 20". In view of the above, the sequence of numbers "20, 21, 20, 21, 20", consisting of rounded interval pulse number M' from the first commutation timing to the fifth commutation timing at which the error between the rounded cumulative number of pulses and the real commutation position value becomes zero, is employed as the commutation pulse sequence P and stored in a predetermined storage area. More specifically, when a system including the driver circuit 10, the brushless motor 1, and the position detector 15 disposed on the paper feed mechanism driven by the brushless motor 1 is shipped from a factory, the commutation pulse sequence P is set and stored in a predetermined storage area.

The operation of the first embodiment is described below with reference to a flow chart illustrating an example of a processing flow performed by the commutation control circuit 12.

Figure 2:
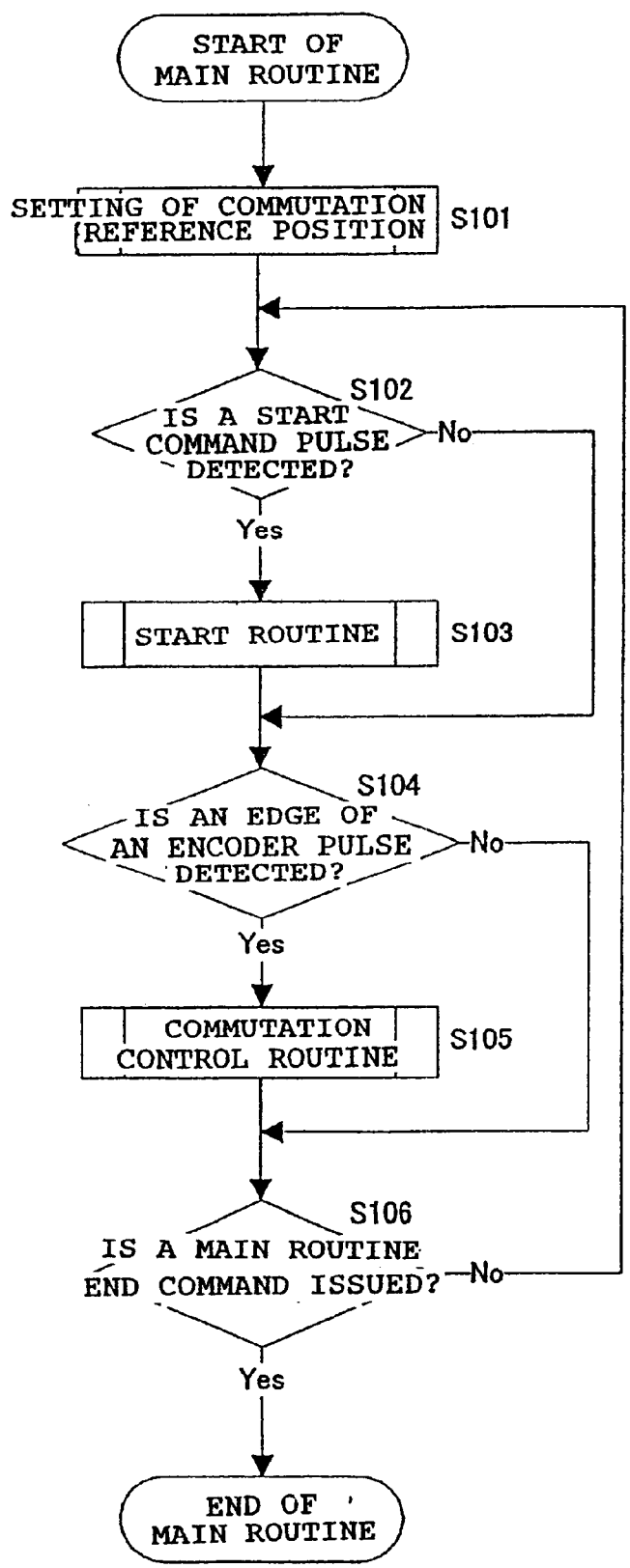
FIG. 2 is a flow chart illustrating an example of a main routine according to a first, second, and third embodiment.
Figure 3:
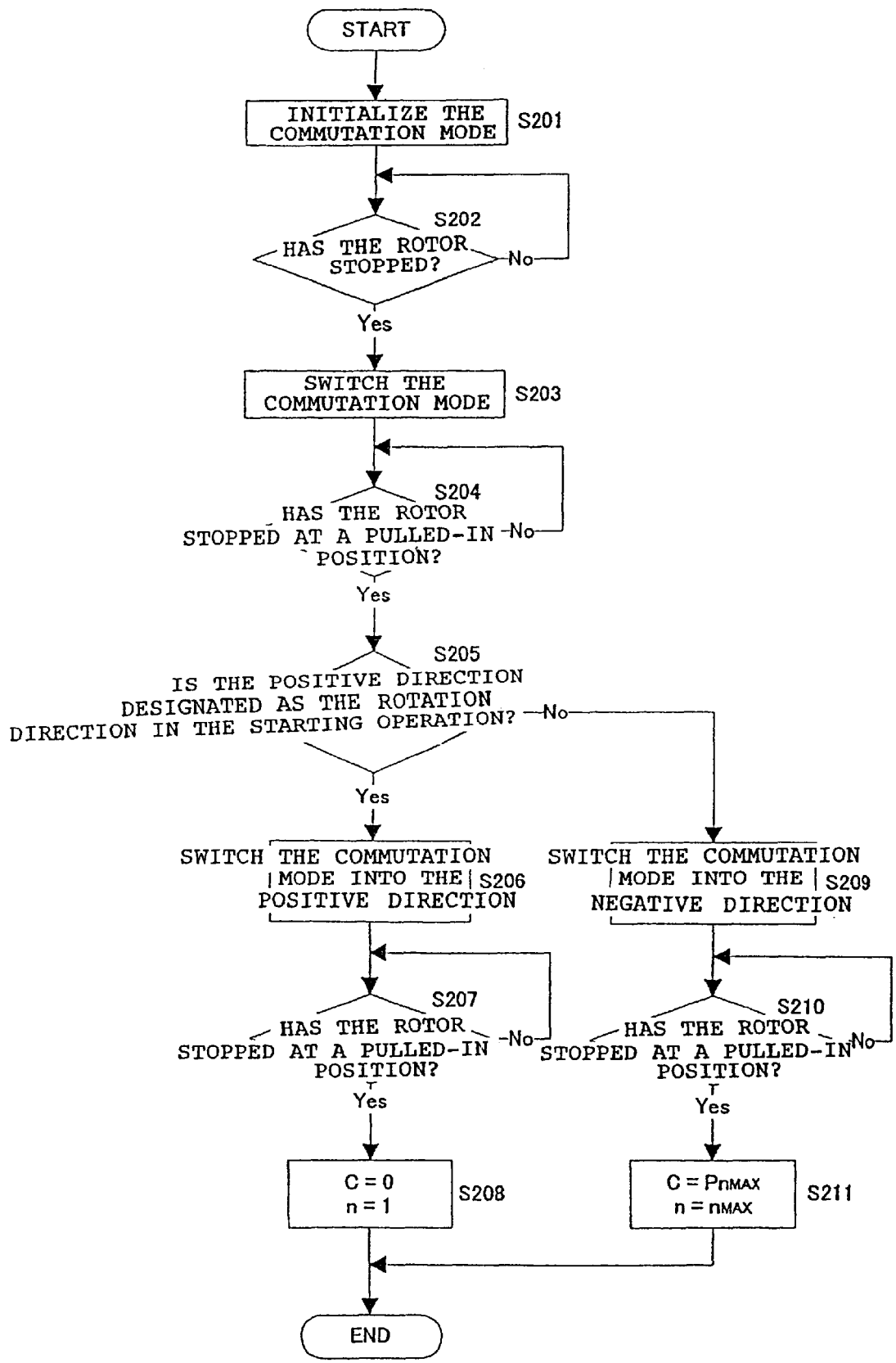
FIG. 3 is a flow chart illustrating an example of a commutation reference point setting routine shown in FIG. 2.

In the commutation control circuit 12, when power is turned on, a main routine shown in FIG. 2 is started. In a first step S101 in the main routine, setting of the commutation reference point is performed. In this step, the commutation reference point used in generating commutation timings is set. More specifically, first, in step S201, as shown in FIG. 3, the commutation mode indicating a phase to be excited in the brushless motor 1 is initialized. In response, as in the conventional known commutation control operation, commutation signals corresponding to the initialized commutation mode are generated and output to the respective transistors in the inverter 11 thereby controlling the respective transistors such that the specified phase is excited and thus a first pulling-in operation is performed on the rotor.

Then in step S202, it is determined whether the rotor has stopped on the basis of, for example, whether a pulse edge has not been detected for a predetermined period of time. If the rotor has stopped, the routine goes to step S203. In step S203, excitation is performed after switching the commutation mode such that the next pulled-in position becomes different from the first pulled-in position obtained in the pulling-in operation performed in step S201, by a magnitude not equal to either 180° or an integral multiple of 180° in electrical angle. As a result, second pulling-in of the rotor is performed. In step S204, the routine waits until the rotor has stopped. If the rotor has stopped, the routine goes to step S205. In step S205, it is determined which rotational direction is specified by the higher-level device, for the starting operation of the brushless motor 1. In case the forward direction is specified, the routine goes from step S205 to step S206. In step S206, after switching the commutation mode into the forward direction, excitation is performed. As a result, third pulling-in of the rotor is performed. Thereafter, the routine goes to step S207 and waits until the rotor has stopped. If the rotor has stopped, the routine goes to step S208. In step S208, the third pulled-in position is employed as the commutation reference point, and the count value C is set to C=0. Furthermore, a variable n is set to n=1, wherein the variable n specifies a particular one (Pn) of nMax elements of the preset commutation pulse sequence P stored in the predetermined storage area. Herein each element of the commutation pulse sequence P represents the number of pulses per commutation interval.

On the other hand, in the case where it is determined in step S205 that the reverse direction is specified by the higher-level device, the routine goes from step S205 to step S209. In step S209, after switching the commutation mode in the reverse direction, third pulling-in of the rotor is performed. Thereafter, the routine goes to step S210 and waits until the rotor has stopped. If the rotor has stopped, the routine goes to step S211. In step S211, the third pulled-in position is employed as the commutation reference point, and the count value C is set to C=PnMAX. Furthermore, the variable n, which specifies a particular one (Pn) of elements of the commutation pulse sequence P, is set to n=nMAX. Thus, the commutation reference point setting routine is completed.

Note that PnMAX represents the value of the rounded interval pulse number M' (the element Pn of the sequence P) when the variable n is equal to nMAX.

Figure 4:
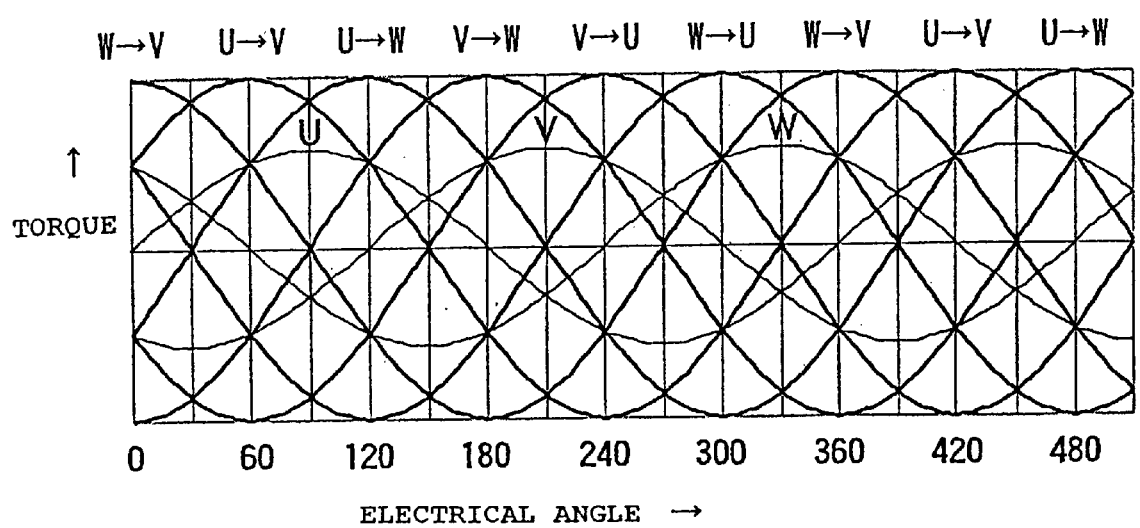
FIG. 4 is a diagram illustrating excited phases and torque varying with the change in the position of a rotor.

The movement of the rotor during the commutation reference point setting routine is described below. FIG. 4 illustrates the torque of the respective excited phases varying with the change in the position of the rotor of the brushless motor 1. For example, when the rotor is at a position at which the electrical angle becomes equal to 180°, if the initial value of the commutation mode is set such that a current flows from the phase V to the phase W, the rotor is rotated in a direction toward greater angles in FIG. 4 until reaching a position of 270°. Herein, if the commutation mode is switched such that a current flows from the phase V to the phase U, the rotor is further rotated toward a position of 330°.

In particular cases it may happen in the first excitation, that the rotor does not move. There are two possibilities. A first possibility is that excitation is performed when the rotor is at rest at a position shifted by an electrical angle of 180° from a first pulled-in position. In this case, the rotor receives torque in both directions, and the magnitudes of the torque are equal in the right and left directions. Thus, the torque is balanced and the rotor does not move. For example, in FIG. 4, when the rotor is at rest at a position of 90°, if the initial value of the commutation mode is set such that a current flows from the phase V to the phase W, the rotor will be pulled in and stop at a position of 270°. The position of 270° which is the first pulled-in position is different in electrical angle by 180° from the position of 90° at which the rotor is at rest, and thus the torque is balanced and the rotor cannot move. Such a position is called an "unstable rest position". Because the unstable rest position is different from a "stable rest position" which is the right position into which the rotor should be pulled by the first excitation, if the commutation reference point is set at that wrong position, commutation will be performed at wrong positions in the following operation. This problem can be avoided if excitation is performed twice such that the pulled-in positions become different in electrical angle from each other by a magnitude not equal to either 180° or an integral multiple of 180°. In this case, even if the rotor is pulled by the first excitation into a wrong position different in electrical angle by 180° from a correct pulled-in position, when the second excitation is started, the rotor is at a position other than a position shifted in electrical angle by 180° or an integral multiple of 180° from a second pulled-in position, and thus the rotor is assured to move. For example, when first excitation cannot move the rotor which is at rest at the position of 90°, if second excitation is performed such that a current flows from the phase V to the phase U, the rotor is pulled into a position of 330°. That is, the rotor receives a torque in a direction toward smaller angles in FIG. 4 and thus is pulled into the position of the 330°. Note that, in the diagram shown in FIG. 4 in which the electrical angle is represented along the horizontal axis, the position of 90° is equivalent to a position of 450°.

The second possibility for the rotor not to move in response to first excitation is discussed below. In FIG. 4, when excitation is performed such that a current flows from the phase V to the phase W, if the rotor is near a position of 270° such as a position of 260°, and if the torque applied to the rotor is smaller than a frictional torque applied to the rotary shaft of the motor, the rotor does not move. However, in the case where the rotor does not move when first excitation is performed such that a current flows from the phase V to the phase W, if the commutation mode is switched in the second excitation such that a current flows from the phase V to the phase U, the rotor receives a torque in the direction toward greater angles in FIG. 4, and thus the rotor is rotated until it is pulled into a position of 330°.

That is, in the case where excitation is performed only once, there is a possibility that, depending upon the position at which the rotor is at rest, the rotor does not move to a correct pulled-in position. However, if excitation is performed twice such that pulled-in positions become different in electrical angle from each other by a magnitude not equal to either 180° or an integral multiple of 180°, the rotor is assured to be moved and brought to a desired pulled-in position by the second excitation even if it is not moved by the first excitation. Herein, the first excitation and the second excitation should be different in phase by a magnitude not equal to either 180° or an integral multiple of 180° in electrical angle. More specifically, in the case of a 3-phase motor, the difference in phase may be 60°, 120°, 240°, or 270°.

In the second pulling-in operation, the rotor is pulled-in in the forward direction or reverse direction, depending upon the position at which the rotor was at rest immediately before it was subjected to the first pulling in operation.

First, an operation is discussed below for the case where, in a system in which the rotational force of the brushless motor 1 is transmitted to the paper feed mechanism via the gear transmission mechanism and the position detector 15 operates responsively, the commutation reference point is set at the second pulled-in position, and, thereafter, the brushless motor 1 is driven in the forward direction. Herein, if the rotor is pulled-in in the forward direction in the second pulling-in operation, there is no difference, in the operation after starting the brushless motor 1, between the actual position of the rotor and the position of the rotor indicated by the count value of pulses output from the position detector 15. On the other hand, if the rotor is pulled-in in the reverse direction in the second pulling-in operation, the paper feed mechanism to be driven by the brushless motor 1 does not rotate and thus no pulse is output from the position detector 15 during a certain period of time immediately after the brushless motor 1 is started, because of backlash of the gear transmission mechanism, although the rotor rotates. As a result, a difference occurs between the actual position of the rotor and the position of the rotor indicated by the count value of pulses output from the position detector 15. That is, in the case where pulling-in of the rotor is performed only twice, the hysteresis of rotation of the rotor cannot be uniquely determined, and the influence of backlash upon the setting of the commutation reference point cannot be deleted. This makes it difficult to perform commutation with correct timings.

However, after the rotor was pulled into a position with an electrical angle of, for example, 330° in FIG. 4 through the second pulling-in operation, if the commutation mode is switched once more into the same direction as the direction, for example, the forward direction in which the brushless motor 1 is to be started (into the direction toward greater electrical angles), that is, if a third pulling-in operation is performed such that a current flows from the phase W to the phase U, then the rotor rotates in the forward direction from the second pulled-in position of 330° and is pulled into a third pulled-in position with an electrical angle of 390°. If, after setting the commutation reference point at this position, the brushless motor 1 is started in the forward direction, the problem of backlash does not occur and thus no difference occurs between the actual position of the rotor and the position of the rotor indicated by the count value of pulses output from the position detector 15.

As described above, depending upon the position of the rotor, the rotor cannot be rotated by one-time execution of excitation. Although this problem can be avoided by performing excitation twice, another problem arises depending upon whether the rotor is pulled-in in the forward or reverse direction in the second pulling-in operation. However, if excitation is performed three times, the rotor can be rotated in the same direction as the direction in which the motor is to be started. That is, by performing excitation three times such that the commutation mode is switched each time excitation is performed, the influence of backlash of the gear transmission mechanisms can be minimized.

Figure 5:
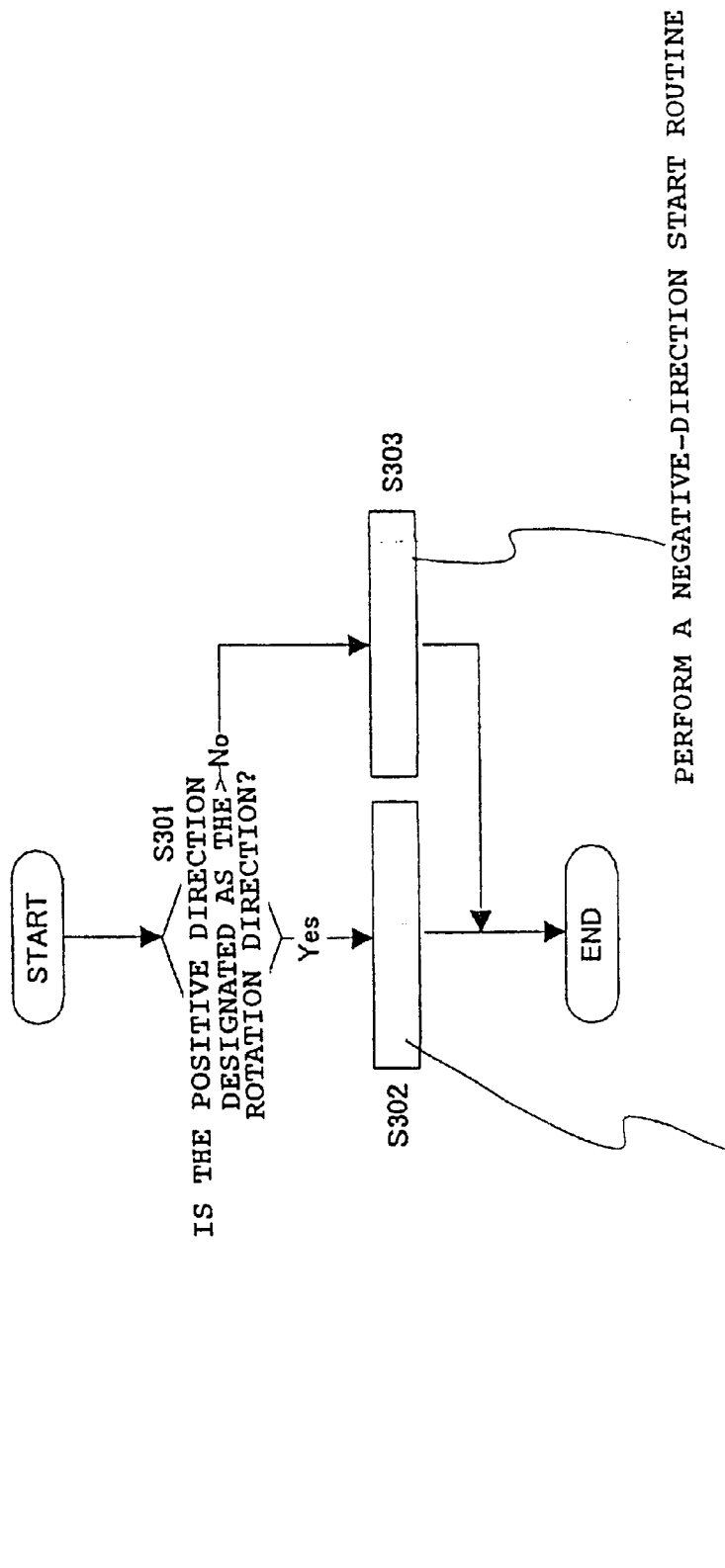
FIG. 5 is a flow chart illustrating an example of a start routine shown in FIG. 2.

Once the setting of the commutation reference point in step S101 shown in FIG. 2 is completed, it is possible to correctly control the commutation of the brushless motor 1 in the following operation. In step S102, if a command signal to start the brushless motor 1 is received from the higher-level device, the routine goes from step S102 to step S103, and a start routine shown in FIG. 5 is performed.

In a first step S301 of the start routine, it is determined which rotational direction is specified by the higher-level device. If the forward direction is specified, the routine goes to step S302, a forward-direction start routine is performed in which the commutation mode is switched once so that the brushless motor 1 can be started in the forward direction. In the case where the reverse direction is specified, the routine goes from step S301 to step S303, and a reverse-direction start routine is performed in which the commutation mode is switched once so that the brushless motor 1 can be started in the reverse direction. After completion of the start routine, the routine returns to the main routine shown in FIG. 2 and goes to step S104.

The phase corresponding to the commutation mode that was set in the start routine is excited via the inverter 11. Herein, the commutation signal may be controlled so as to control the rotational speed. Thus, the brushless motor 1 rotates, the rotational force of the brushless motor 1 is transmitted to the paper feed mechanism via the gear transmission mechanism (not shown). As a result, the paper feed mechanism is driven, and paper is fed.

In response to the movement of the paper feed mechanism, pulse signals are output from the position detector 15, and pulse edges are detected by the commutation control circuit 12. If a pulse edge is detected in step S104 in FIG. 2, the routine goes to step S105, and a commutation control routine is performed. Thereafter, the routine goes to step S106. On the other hand, if no pulse edge is detected in step S104, the routine goes to step S106.

Figure 6:
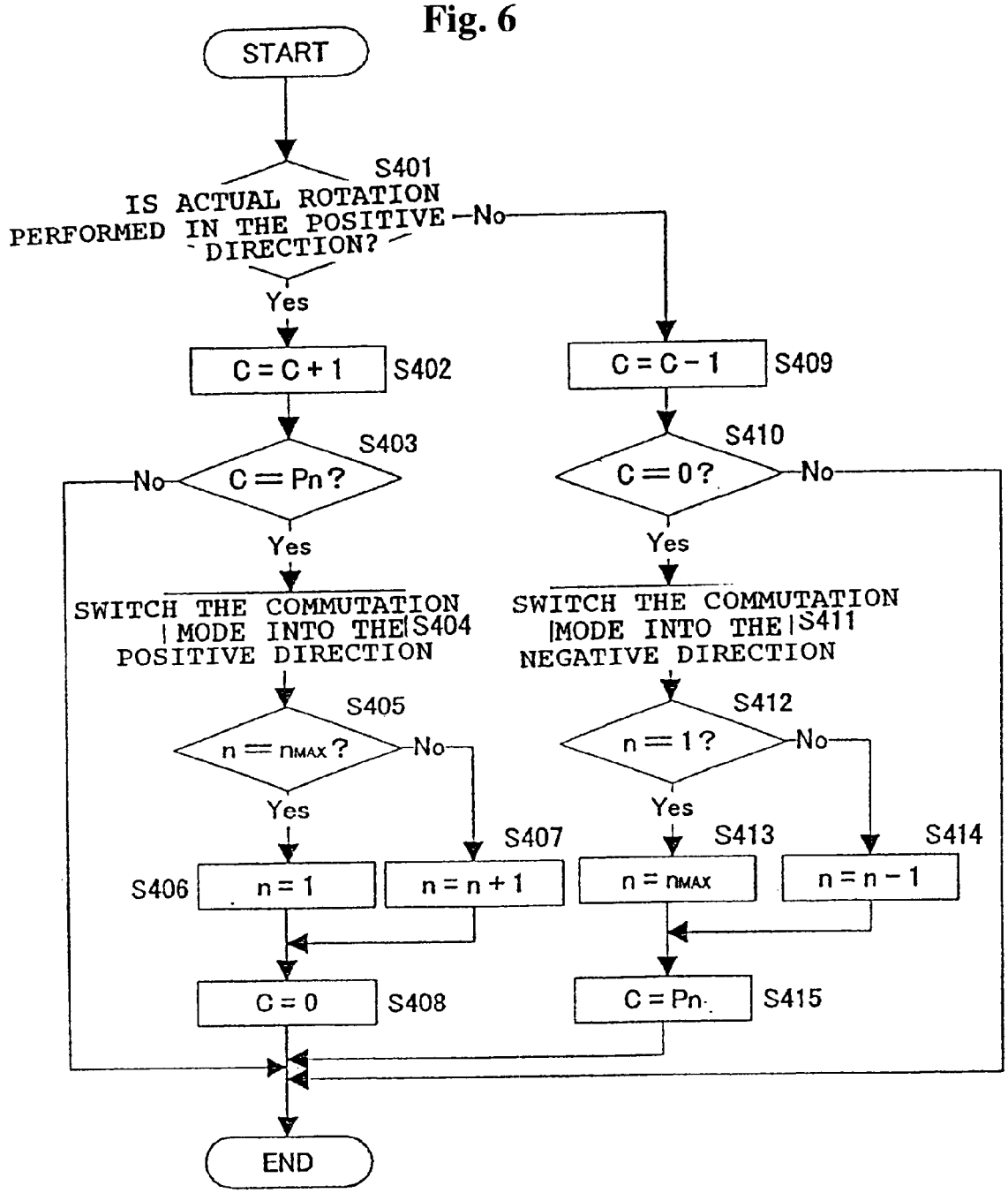
FIG. 6 is a flow chart illustrating an example of a commutation counting routine in FIG. 8 or a commutation counting routine performed as a commutation control routine shown in FIG. 2.

The commutation control routine in step S105 is performed according to a commutation counting routine shown in FIG. 6.

First, in step S401, it is determined, from the two types of pulse signals output from the position detector 15, whether the brushless motor 1 is rotating in the forward or reverse direction. If it is determined that the brushless motor 1 is rotating in the forward direction, the routine goes to step S402, and the count value C is incremented by "1". Then, in step S403, the commutation pulse sequence P stored in the predetermined storage area is checked to determine whether the count value C is equal to the nth element Pn of the commutation pulse sequence P indicating the number of pulses per commutation interval.

For example, when n=1, the number of pulses per commutation interval P1 is "20" as shown in Table 1, and thus, in this specific case, the routine exits from the commutation counting routine and returns to the main routine shown in FIG. 2. In the following process, when the brushless motor 1 is rotating in the forward direction, each time a pulse edge is detected, the routine goes from step S401 to step S403 via step S402 and the count value C is incremented by 1. When the count value C becomes equal to P1=20, the routine goes from step S403 to step S404, and the commutation mode is switched in the forward direction thereby switching the phase to be excited so that the brushless motor 1 can further rotate.

Thereafter, the routine goes to step S405. In step S405, if it is determined that the variable n is equal to nMAX representing the number of elements of the commutation pulse sequence P, the routine goes to step S406, and the variable n is reset to n=1. Thereafter, the routine goes to step S408. On the other hand, in the case the variable n is not equal to nMAX, the routine goes to step S407, and the variable n is incremented by "1". Thereafter, the routine goes to step S408. In step S408, the count value C is reset to C=0. Thereafter, the routine exits from the commutation counting routine and returns to the main routine shown in FIG. 2.

As described above, when the brushless motor 1 is rotating in the forward direction, each time an edge of a pulse signal is detected, the count value C is incremented by "1", and each time the count value C becomes equal to the value of one of the elements Pn of the commutation pulse sequence P, that is, to one of P1 (=20), P2 (=21), P3 (=20), P4 (=21), and P5 (=20), the commutation mode is switched. When the last element P5 of the commutation pulse sequence P is reached, the first element P1 is selected again. Thus, the above process is performed repeatedly such that the rounded interval pulse numbers M' represented by the elements Pn are sequentially selected, in the order from the first element (P1) to the last element (P5) of the commutation pulse sequence P, and the commutation mode is switched when the count value C becomes equal to the selected element Pn.

In this situation, if the brushless motor 1 rotating in the forward direction is stopped to perform, for example, adjustment of the paper feed mechanism, and if, thereafter, a start command to start the brushless motor 1 in the reverse direction is received from the higher-level device, the operation is performed as follows. During the period in which the brushless motor 1 is at rest, no pulse edge is detected, and thus steps S102, S104, and S106 are performed repeatedly without performing the commutation control routine, until a command signal is received from the higher-level device. If a start command is received from the higher-level device, the routine goes from step S102 to step S103, and the start routine shown in FIG. 5 is performed. In this specific case, the reverse direction is specified, and thus the routine goes from step S301 to step S303. In step S303, the commutation mode is switched once so as to rotate the brushless motor 1 in the reverse direction.

As a result, the brushless motor 1 rotates in the reverse direction. If a pulse edge is detected as a result of the rotation of the brushless motor 1, the routine goes from step S104 to step S105, and the commutation counting routine shown in FIG. 6 is performed. In this specific case, because the brushless motor 1 is rotating in the reverse direction, the routine goes from step S401 to step S409, and the count value C decrements by "1".

Thereafter, the routine goes to step S410, and it is determined whether the count value C is equal to "0". If C is not equal to "0", the routine exits from the commutation counting routine and returns to the main routine shown in FIG. 2. If C=0, it is determined that a commutation timing has been reached, and the commutation mode is switched in the reverse direction in step S411. Thereafter, the routine goes to step S412. If it is determined in step S412 that the variable n is equal to 1, the routine goes to step S413, and n is set to n=nMAX. Thereafter, the routine goes to step S415. If the variable n is not equal to "1", the routine goes to step S414, and the variable n decrements by "1". Thereafter, the routine goes to step S415. In step S415, the count value C is set to C=Pn. Thereafter, the routine exits from the commutation counting routine and returns to the main routine shown in FIG. 2.

As described above, when the brushless motor 1 is rotating in the reverse direction, each time a pulse edge is detected, the count value C decrements by "1". When the count value C becomes equal to "0", the commutation mode is switched, and the variable n decrements by "1". Furthermore, the count value C is set to C=Pn. That is, as opposed to the operation in the forward direction, the element Pn is switched in the order from the last element to the first element in the commutation pulse sequence P.

If a command to stop the brushless motor 1, that is, a command to end the main routine shown in FIG. 2, is issued by the higher-level device, the command is detected in step S106, and the main routine is ended.

In the above operation, the real number of pulses per commutation interval, that is, the interval pulse number M is equal to "20.4". Therefore, if commutation is performed each time the count value C becomes equal to, for example, "20", the commutation timing is advanced by "0.4" each time commutation is performed. The timing error is accumulated each time commutation is performed, and the accumulated timing error finally results in an operation failure. Conversely, if commutation is performed each time the count value C becomes equal to "21", the commutation timing is delayed by "0.6" each time commutation is performed, and the commutation timing error is accumulated each time commutation is performed. The accumulated timing error finally results in an operation failure.

However, the above problem of the timing error does not occur in the present invention, because a period, from one commutation timing to another commutation timing at which the sum of the respective interval pulse numbers M in this period becomes equal to an integer, is employed as one cycle, and each rounded interval pulse number M' in this cycle is such an integer that the difference between the cumulative sum of the numbers of pulses per commutation interval and the cumulative sum of the interval pulse numbers M which represents the correct commutation timings becomes minimum at each commutation timing in the cycle. At the end of each cycle, the error of the actual commutation timing with respect to the correct commutation timing becomes zero. Furthermore, because the individual rounded interval pulse numbers M' during one cycle are determined such that the errors of the respective actual commutation timings with respect to the correct commutation timings become minimum, the error is not accumulated each time commutation is performed. The error is always equal to or smaller than one-half of the interval between successively detected pulses. Thus, the error is minimized in the above-described manner.

When the commutation reference point is set before starting the brushless motor 1, that is, when the initial value of C is set, excitation is performed twice to move the rotor and pull-in it to a desired position, and then the third excitation is performed to rotate the rotor in the same direction as the direction in which the brushless motor 1 is to be started after completion of the third pulling-in operation, and, finally, the commutation reference point is set at the third pulled-in position thereby ensuring that the influence of backlash of the gear transmission mechanism is minimized and the commutation reference point is correctly set.

If commutation is performed on the basis of the pulse signals output from the position detector 15 with respect to the commutation reference point set in the above-described manner, the commutation is controlled precisely.

Because the commutation timings are generated on the basis of the pulse signals output from the position detector 15, the commutation can be performed as long as pulses are output from the position detector 15. In contrast, in the conventional technique in which commutation is performed on the basis of a counter electromotive voltage, if the rotational speed of the brushless motor 1 is not high enough, a counter electromotive voltage cannot be detected and commutation cannot be performed. In the present invention, because commutation is controlled on the basis of the pulse signals output from the position detector 15, commutation can be performed regardless of the rotational speed of the motor. That is, commutation is possible even when the rotational speed is low.

In addition to the control of commutation, the paper feeding speed and the feeding amount are also controlled on the basis of the pulse signal output from the position detector 15. Therefore, it is not necessary to provide an additional position detector dedicated to controlling of commutation. This allows a small number of parts of the driver circuit 10.

Furthermore, in the present invention in which commutation timings are generated on the basis of the pulse signal, if the counted number of pulses is stored when the brushless motor 1 is stopped temporarily, it is possible to immediately determine which phase should be excited on the basis of the number of pulses stored when the brushless motor 1 is started again. Furthermore, because commutation timings can be generated even at low speeds, commutation can be correctly controlled even immediately before the brushless motor 1 is stopped or even immediately after the brushless motor 1 is started.

Note that the process in step S101 shown in FIG. 2 corresponds to commutation reference point setting means, and the commutation counting routine shown in FIG. 6 corresponds to commutation control means. Both means are included in the commutation control circuit 12.

A second embodiment of the present invention is described below.

Figure 7:
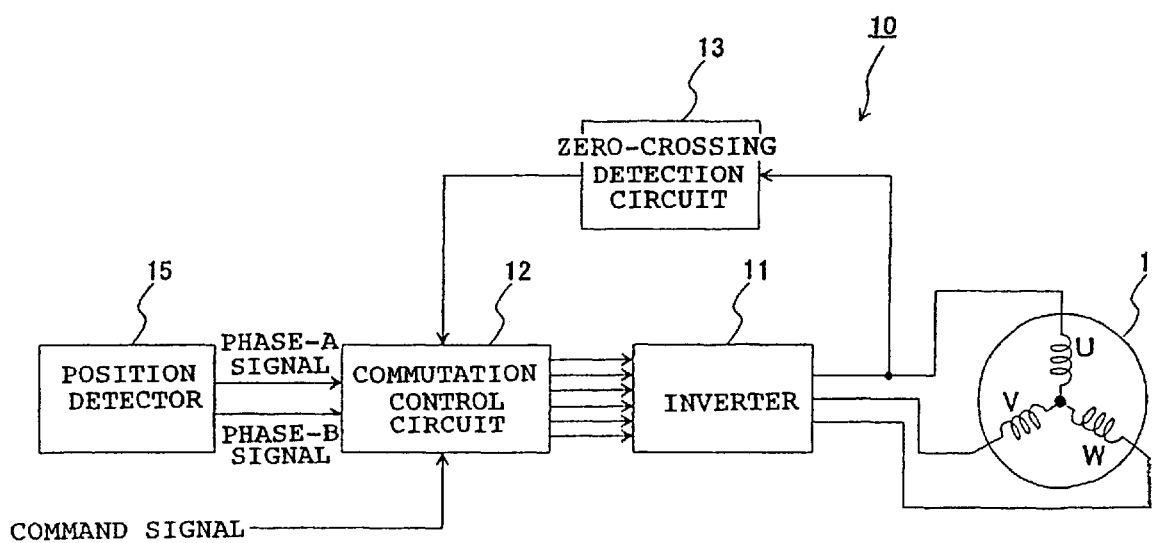
FIG. 7 is a schematic diagram of a brushless motor driving apparatus according to the second embodiment.

As shown in FIG. 7, the second embodiment is similar to the first embodiment described above except that the driver circuit 10 additionally includes a zero-crossing detection circuit 13 serving as counter electromotive force detection means and that the commutation control circuit 12 operates differently. Thus, similar parts to those in the first embodiment are denoted by similar reference numerals, and they are not described in further detail again.

The zero-crossing detection circuit 13, formed of a comparator or the like, monitors a counter electromotive voltage of one of phases of the inverter 11. If the zero-crossing detection circuit 13 detects a mid-point voltage of the counter electromotive voltage, that is, if it detects a zero-crossing point, the zero-crossing detection circuit 13 discriminates the polarity of the counter electromotive voltage immediately before the zero-crossing point. If the discriminated polarity is positive, the zero-crossing detection circuit 13 outputs a high-level signal to the commutation control circuit 12, while a low-level signal is output if the polarity is negative.

The commutation control circuit 12 switches the commutation mode in accordance with the count value C in a similar manner as in the first embodiment. When the rotational speed of the brushless motor 1 has become high enough to generate a commutation timing on the basis of the zero-crossing of the counter electromotive voltage, the commutation control circuit 12 generates the commutation timing on the basis of detection of zero-crossing and resets the commutation reference point on the basis of the commutation timing.

That is, in this second embodiment, when the power switch of the printer is turned on and thus the driver circuit 10 is activated, the commutation control circuit 12 first starts the main routine shown in FIG. 2 as in the first embodiment. In a first step S101 in the main routine, as in the first embodiment, the commutation reference point setting routine, the details of which are shown in FIG. 3, is performed. After setting the count value C to 0 or PnMAX and setting the commutation reference point, the routine goes to step S102. If, in step S102, a command to start the brushless motor 1 is received from the higher-level device, the routine goes to step S103 to perform the start routine shown in FIG. 5 in the same or a similar manner as in the first embodiment. As a result, the brushless motor 1 rotates, and the rotational force of the brushless motor 1 is transmitted to the paper feed mechanism via the gear transmission mechanism (not shown). In response to the movement of the paper feed mechanism, two types of pulse signals which are different in phase from each other are output from the position detector 15.

Figure 8:
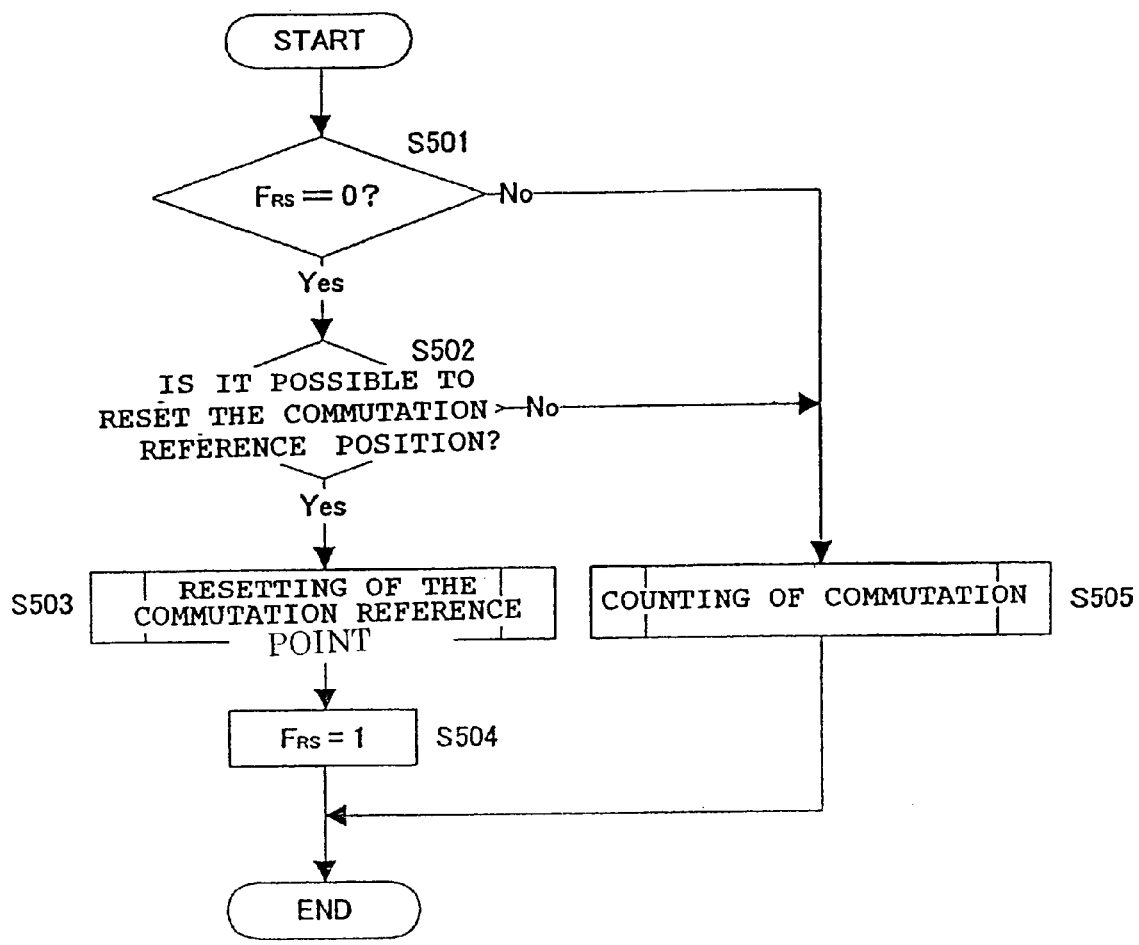
FIG. 8 is a flow chart illustrating an example of a commutation control routine shown in FIG. 2.

If an edge of a pulse signal output from the position detector 15 is detected in step S104, the routine goes to step S105 to perform a commutation control routine the details of which are shown in FIG. 8. In a first step S501 of the commutation control routine shown in FIG. 8, it is determined whether a commutation reference point reset flag $F_{RS}$ has a value of "0". If $F_{RS}=0$, the routine goes to step S502. Note that the commutation reference point reset flag $F_{RS}$ has a value equal to "1" when resetting of the commutation reference point has been completed, while the commutation reference point reset flag $F_{RS}$ has a value equal to "0" when resetting of the commutation reference point has not been completed. In an initial state after the brushless motor 1 is started, $F_{RS}$ is set to "0".

In step S502, it is determined whether resetting of the commutation reference point is possible, that is, it is determined whether the rotational speed of the brushless motor 1 is within a range which allows a commutation timing to be generated in accordance with a counter electromotive voltage. The determination may be performed, for example, on the basis of the number of pulses per unit time. In the case where resetting of the commutation reference point is not possible, that is, in the case where the rotational speed of the brushless motor 1 is low, the routine jumps from step S502 to step S505, and the commutation counting routine shown in FIG. 6 is performed.

That is, if the rotation is in the forward direction, the routine goes from step S401 in FIG. 6 to step S402. Each time an edge of a pulse signal is detected, the count value C is incremented. When the count value C becomes equal to the value of the nth element Pn of the commutation pulse sequence P, the routine goes from step S403 to step S404, and the commutation mode is switched. Furthermore, the value of n is changed (steps S405 to S407). Thereafter, the count value C is reset to 0 (step S408).

Figure 9:
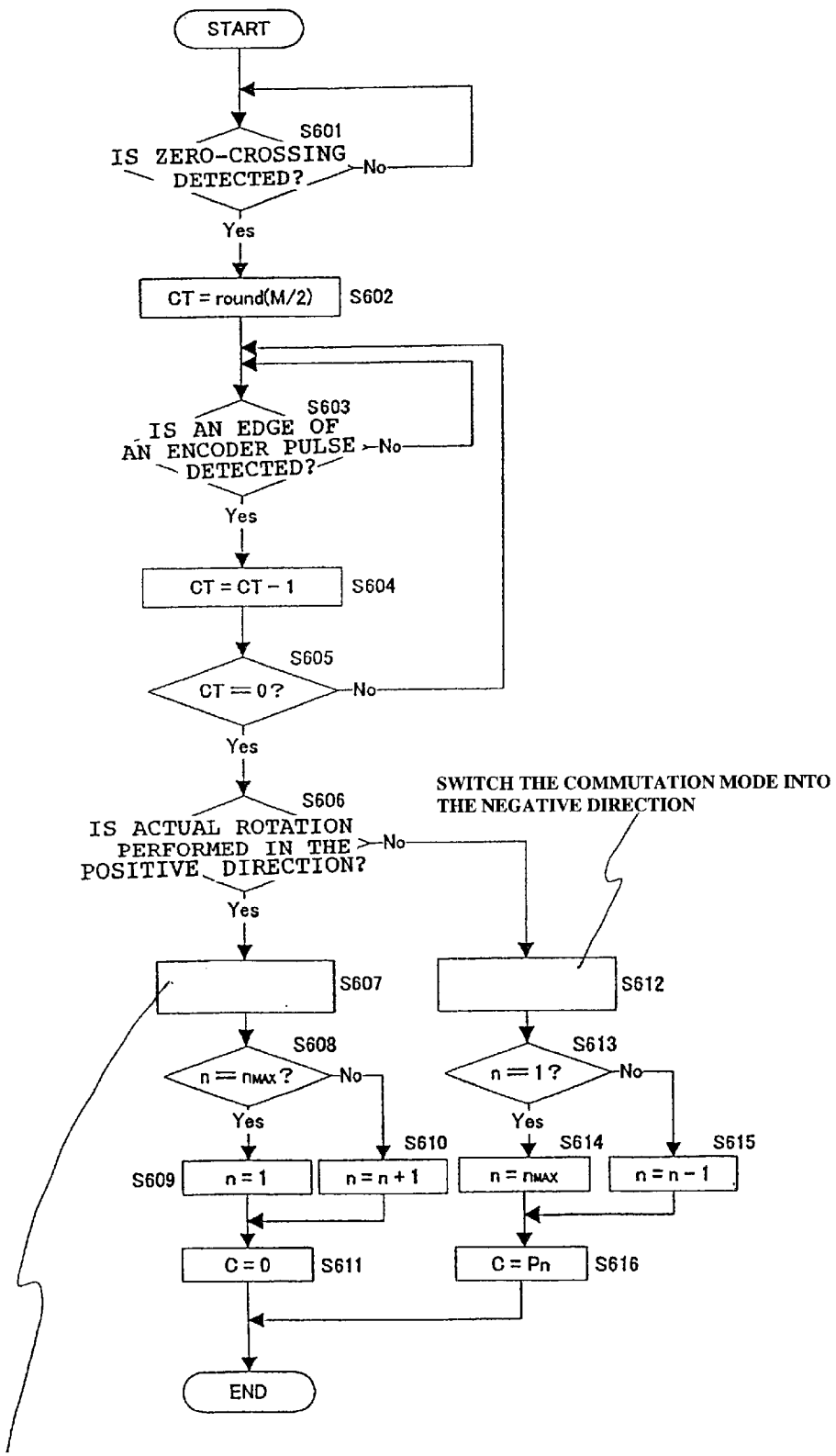
FIG. 9 is a flow chart illustrating an example of a commutation reference point resetting routine shown in FIGS. 8 and 12.

When the rotational speed of the brushless motor 1 has increased to a level high enough to detect a counter electromotive voltage, the routine goes from step S502 to S503 to perform a commutation reference point resetting routine the details of which are shown in FIG. 9.

In a first step S601 in the commutation reference point resetting routine shown in FIG. 9, it is determined whether the zero-crossing detection circuit 13 has detected a zero-crossing of the counter electromotive voltage. If a zero-crossing has been detected, the routine goes to step S602. In step S602, a count value CT is set to one-half the number of pulses output from the position detector 15 during one commutation interval. More specifically, for example, the count value CT is set to round(M/2), that is, an integer obtained by rounding one-half the interval pulse number M.

Thereafter, the routine goes to step S603. In step S603, if an edge of a pulse signal output from the position detector 15 is detected, the routine goes from step S603 to step S604, and the count value CT decrements by "1". Thereafter, in step S605, it is determined whether the count value CT is equal to "0". If the count value CT is not equal to "0", the routine returns from step S605 to S603 and waits until the next edge is detected. If the count value CT becomes equal to 0, it is determined that a timing of commutation has been reached, and the routine goes to step S606. That is, when one-half of one commutation interval has elapsed since the zero-crossing of the counter electromotive voltage was detected, that is, at a point of time corresponding to a delay of 30° in electrical angle with respect to the zero-crossing, it is determined that a timing of commutation has been reached. In step S606, it is determined whether the rotation is in the forward direction. If the rotation is in the forward direction, the routine goes to step S607, and the commutation mode is switched in the forward direction. Thereafter, the routine goes to step S608. However, if it is determined in step S606 that the rotation is in the reverse direction, the routine goes from step S606 to step S612, and the commutation mode is switched in the reverse direction. The routine then goes to step S613. As in the commutation counting routine shown in FIG. 6, the variable n indicating the element Pn of the commutation pulse sequence P is changed (steps S608 to S610 in forward rotation, steps S613 to S615 in reverse rotation), and the count value C is reset (step S611 in forward rotation, step S616 in reverse rotation). Thus, the resetting of the commutation reference point is completed. Thereafter, the routine returns from FIG. 9 to FIG. 8, and goes from step S503 to step S504. In step S504, the commutation reference point reset flag $F_{RS}$ is set to "1". In the following operation, because the commutation reference point reset flag $F_{RS}$ has a value equal to "1", each time a pulse edge is detected in step S104 in the main routine shown in FIG. 2, the routine goes from step S501 to step S505 in FIG. 8, and the commutation counting routine shown in FIG. 6 described above with reference to the first embodiment is performed to switch the commutation mode in accordance with the count value C which is changed in response to the operation.

Thus, in the second embodiment, advantages similar to those obtained in the first embodiment described above are obtained. Besides, in the second embodiment, when the counter electromotive force becomes detectable, at a point of time at which a period of time corresponding to one-half the unit commutation interval has elapsed since the zero-crossing of counter electromotive voltage induced in non-exciting phase, that is, at a point of time corresponding to a delay of 30° in electrical angle with respect to the zero-crossing, a commutation timing is generated and the count value C is reset, that is, the commutation reference point is reset. Therefore, even if a relative large error occurs in the commutation reference point which is set in step S101 before starting the brushless motor 1, once the commutation reference point is reset in step S503, the error of the commutation reference point with respect to the position of the rotor, that is, the commutation timing error, falls within a small range corresponding to one interval of the pulses output from the position detector 15. Thus, the accuracy of the commutation timing is further improved, and the high accuracy can be maintained. This makes it possible to reduce a torque ripple and a fluctuation of the rotational speed during a fixed-speed operation.

A third embodiment of the present invention is described below.

In the third embodiment, two commutation reference points are defined for use in the forward rotation and for use in the reverse rotation. That is, compared to the second embodiment described above, a count value CR for use in the forward rotation and a count value CL for use in the reverse rotation are introduced, and commutation is controlled in accordance with the count value CR when the brushless motor 1 is rotated in the forward direction, while commutation is controlled in accordance with the count value CL when the brushless motor 1 is rotated in the reverse direction. Furthermore, the two commutation reference points are reset on the basis of a zero-crossing of the counter electromotive voltage induced in non-exciting phase of the stator coil of the brushless motor 1. The third embodiment is similar to the second embodiment described above except that the commutation control circuit 12 operates in a different manner, and thus similar parts are denoted by similar reference numerals, and they are not described in further detail again.

In the third embodiment, when being activated, the main routine shown in FIG. 2 is executed. However, the commutation reference point setting routine in step S101 is performed in a manner as shown in FIG. 10.

Figure 10:
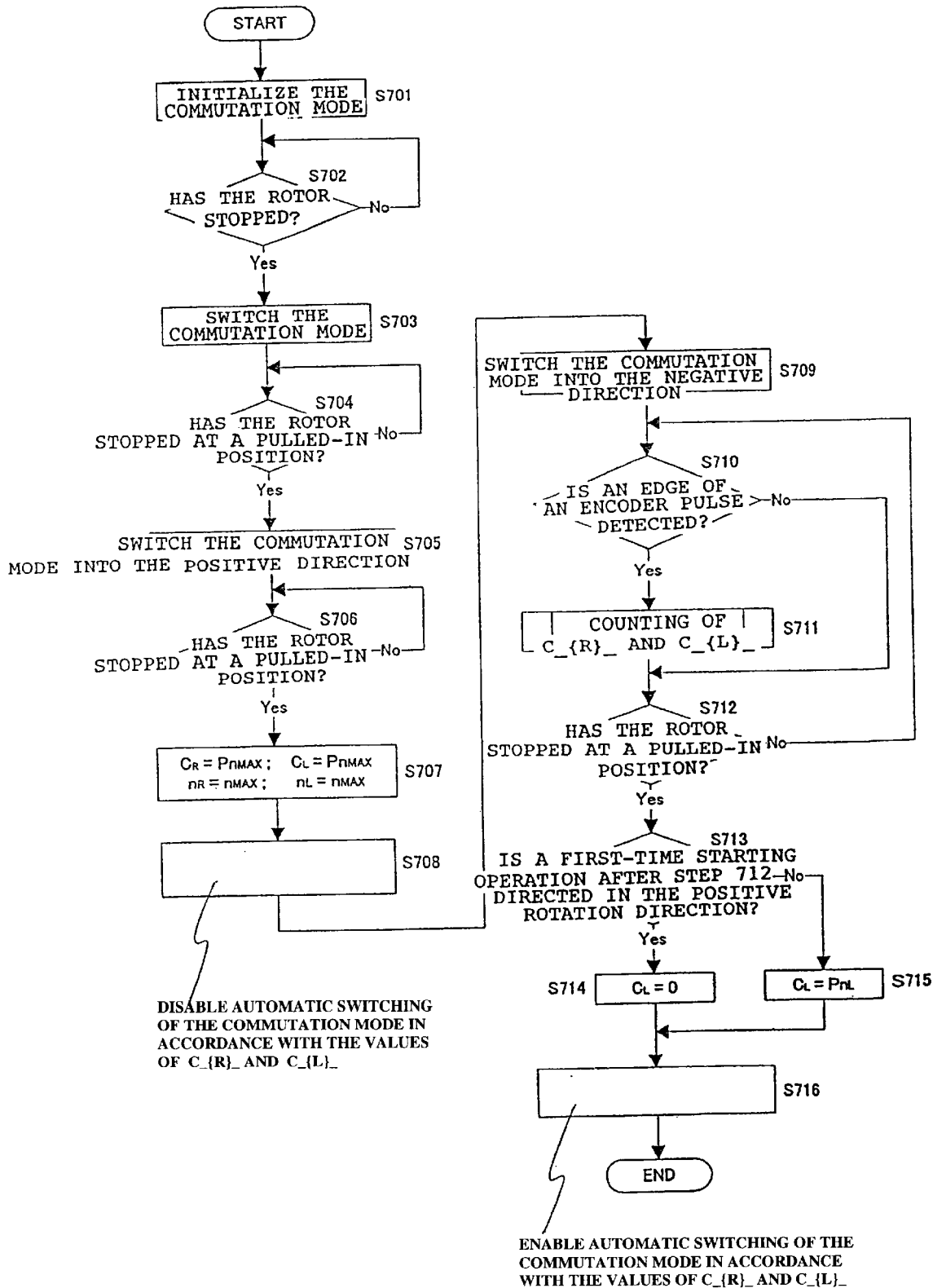
FIG. 10 is a flow chart illustrating an example of a commutation reference point setting routine shown in FIG. 2.

In the commutation reference point setting routine shown in FIG. 10, first, in step S701, the commutation mode is initialized to a predetermined value. In response, as in the conventional known commutation control operation, commutation signals corresponding to the initialized commutation mode are generated and output to the respective transistors in the inverter 11 thereby controlling the respective transistors such that the specified phase is excited and thus performing a first pulling-in operation upon the rotor.

Thereafter, in step S702, it is determined whether the rotor has stopped. If the rotor has stopped, the routine goes to step S703. In step S703, excitation is performed after switching the commutation mode such that the next pulled-in position becomes different from the first pulled-in position obtained in the pulling-in operation performed in step S701, by a magnitude not equal to either 180° or an integral multiple of 180° in electrical angle. As a result, a second pulling-in of the rotor is performed. The routine then goes to step S704 and waits until the rotor stops. If the rotor has stopped at the pulled-in position, the routine goes to step S705. In step S705, at the second pulled-in position to which the rotor was pulled-in in step S703, the commutation mode is switched in the forward direction. As a result, a third pulling-in of the rotor is performed. The routine goes to step S706 and waits until the rotor stops. If the rotor has stopped at the pulled-in position, the routine goes to step S707. In step S707, the third pulled-in position is employed as a commutation reference point for use in rotation in the forward direction, and the forward-direction count value CR is set to CR=PnMAX. Herein, the reverse-direction count value CL is also set to CL=PnMAX. Furthermore, a forward-direction variable nR is set to nR=nMAX, wherein the variable nR specifies a particular element Pn of the preset commutation pulse sequence P stored in the predetermined storage area. A reverse-direction variable nL is also set to nL=nMAX. Thereafter, in step S708, automatic switching of the commutation mode on the basis of the count values CR and CL shown in FIG. 11, which will be described later, is disabled. Thereafter, the routine goes to step S709. In step S709, at the third pulled-in position to which the rotor was pulled-in in step S705, the commutation mode is forcedly switched in the reverse direction. Thereafter, the routine goes to step S710. As a result of the switching of the commutation mode in step S709, the rotor is subjected to a fourth pulling-in operation. In step S710, if an edge of an encoder pulse output from the position detector 15 is detected, the routine goes to step S711. In step S711, a counting routine shown in FIG. 11 is performed to count CR and CL.

Figure 11:
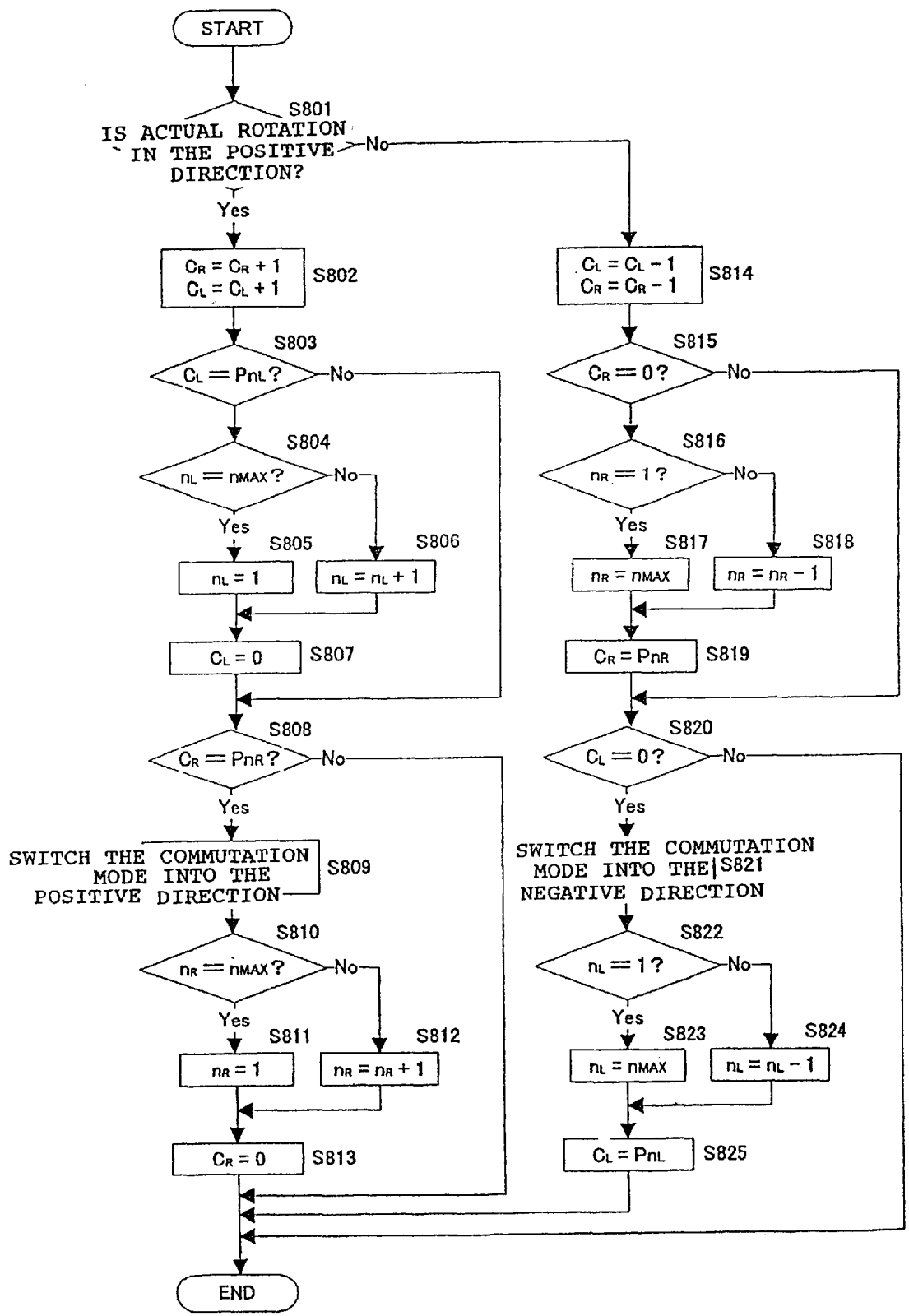
FIG. 11 is a flow chart illustrating an example of a commutation counting routine shown in FIGS. 10 and 12.

In a first step S801 of the counting routine shown in FIG. 11, the two types of pulse signals are examined to determine whether the brushless motor 1 is rotating in the forward or reverse direction. If the rotation is in the forward direction, the routine goes to step S802, and the forward-direction count value CR and the reverse-direction count value CL are incremented by 1. Thereafter, the routine goes to step S803. In step S803, the value of the reverse-direction count value CL is checked to determine whether CL=PnL. If CL=PnL, the routine goes to step S804, and the value of the reverse-direction variable nL is checked to determine whether nL=nMAX. If nL=nMAX, the routine goes to step S805, and nL is set to nL=1. However, if nL is not equal to nMAX, the routine goes to step S806, and nL is incremented. Thereafter, the routine goes to step S807. In step S807, the count value CL is set to CL=0. Thereafter, the routine goes to step S808. On the other hand, in the case where it is determined in step S803 that the count value CL is not equal to PnL, the routine goes to step S808. In step S808, the count value CR is checked to determine whether CR=PnR. If CR is not equal to PnR, the commutation counting routine is ended. On the other hand, if it is determined in step S808 that CR=PnR, it is determined that a commutation timing has been reached, and the routine goes to step S809.

In a normal situation, in this step S809, the commutation mode is switched in the forward direction. However, in this specific case, because the counting routine shown in FIG. 11 is executed in step S711 shown in FIG. 10 and thus the automatic switching of the commutation mode in accordance with the values of CR and CL has been disabled in step S708, the switching of the commutation mode in step S809 is not executed, and the routine goes to step S810. In step S810, the forward-direction variable nR is checked to determine whether nR=nMAX. If nR=nMAX, the routine goes to step S811, and nR is set to nR=1. However, if nR is not equal to nMAX, the routine goes to step S812, and nR is incremented. Thereafter, the routine goes to step S813, and the forward-direction count value CR is set to CR=0. Thereafter, the commutation counting routine is ended.

On the other hand, in the case where it is determined in step S801 that the rotation is in the reverse direction, the routine goes from step S801 to step S814, and the count values CR and CL decrement by 1. Thereafter, the routine goes to step S815, and it is determined whether the forward-direction count value CR is equal to "0". If the count value CR is equal to "0", the routine goes to step S816, and the forward-direction variable nR is checked to determine whether nR=1. If nR=1, the routine goes to step S817, and nR is set to nR=nMAX. However, if nR is not equal to 1, the routine goes to step S818, and nR decrements. Thereafter, the routine goes to step S819. In step S819, the forward-direction count value CR is set to CR=PnR. Thereafter, the routine goes to step S820. On the other hand, if it is determined in step S815 that the forward-direction count value CR is not equal to "0", the routine goes to step S820. In step S820, the reverse-direction count value CL is checked to determine whether CL=0. If it is determined in step S820 that CL is not equal to "0", the commutation counting routine is ended. However, when CL=0, the routine goes to step S821.

In a normal situation, in this step S821, the commutation mode is switched in the reverse direction. However, in this specific case, the automatic switching of the commutation mode in accordance with the values of CR and CL is disabled during the commutation counting routine shown in FIG. 11 as described above, and thus the routine goes to step S822 without executing the switching of the commutation mode in step S821. In step S822, the reverse-direction variable nL is checked to determine whether nL=1. If nL=1, the routine goes to step S823, and nL is set to nL=nMAX. Thereafter, the routine goes to step S825. However, if it is determined in step S822 that nL is not equal to 1, the routine goes to step S824, and nL decrements. Thereafter, the routine goes to step S825. In step S825, the reverse-direction count value CL is set to CL=PnL, and the commutation counting routine is ended.

After completion of step S711 shown in FIG. 10, that is, the routine shown in FIG. 11, the routine goes to step S712 to determine whether the rotor has stopped at the pulled-in position. If the rotor has not stopped, the routine returns to step S710, and steps S710 to S712 are performed repeatedly until the rotor has stopped at the pulled-in position. That is, each time an edge of a pulse is detected, CR and CL are incremented or decremented depending upon the rotational direction, thereby counting CR and CL. Note that, in the above process, the commutation mode is not switched regardless of the values of CR and CL.

If it is determined in step S712 that the rotor has stopped at the pulled-in position, the commutation reference point for use in rotation in the reverse direction is set at this pulled-in position, and the reverse-direction count value CL is reset. Herein, the count value CL is reset to a different value depending upon the direction in which the brushless motor 1 is to be started after completion of the commutation reference point setting routine. In the case where it is determined in step S713 that the specified rotational direction is the forward direction, the routine goes to step S714, and the count value CL is set to CL=0. On the other hand, in the case where it is determined in step S713 that the specified rotational direction is the reverse direction, the routine goes to step S715, and the count value CL is set to CL=PnL. Thereafter, the routine goes to step S716, and automatic switching of the commutation mode in accordance with the count values CR and CL is enabled. Thus, the commutation reference point setting routine shown in FIG. 10 is completed.

In the commutation reference point setting routine shown in FIG. 10, as described above, excitation is performed twice to ensure that the rotor moves and is pulled-in to a desired position, and then a third excitation is performed to rotate the rotor in the forward direction and the commutation reference point is set at the third pulled-in position thereby ensuring that the influence of backlash of the gear transmission mechanism in the forward direction is deleted and the commutation reference point for use in the forward rotation is correctly set, and, finally, a fourth excitation is performed to rotate the rotor in the reverse direction and the commutation reference point is set at the fourth pulled-in position thereby ensuring that the influence of backlash of the gear transmission mechanism in the reverse direction is deleted and the commutation reference point for use in the reverse rotation is correctly set. Thus, the influence of the backlash of the gear transmission mechanism in both forward and reverse directions is minimized, and the commutation reference points are correctly set.

After completion of the commutation reference point setting routine shown in FIG. 10, that is, step S101 shown in FIG. 2, the routine goes from step S101 shown in FIG. 2 to step S102. If a start command is received from the higher-level device, the routine goes to step S103, and the start routine shown in FIG. 5 is performed. That is, the start routine is performed in a different manner depending upon the rotational direction as in the first or second embodiment. Thereafter, the routine goes to step S104.

In response to the movement of the gear transmission mechanism (not shown), pulses are output from the position detector 15. If a pulse edge is detected in step S104, the routine goes from step S104 to step S105, and a commutation control routine shown in FIG. 12 is performed.

Figure 12:
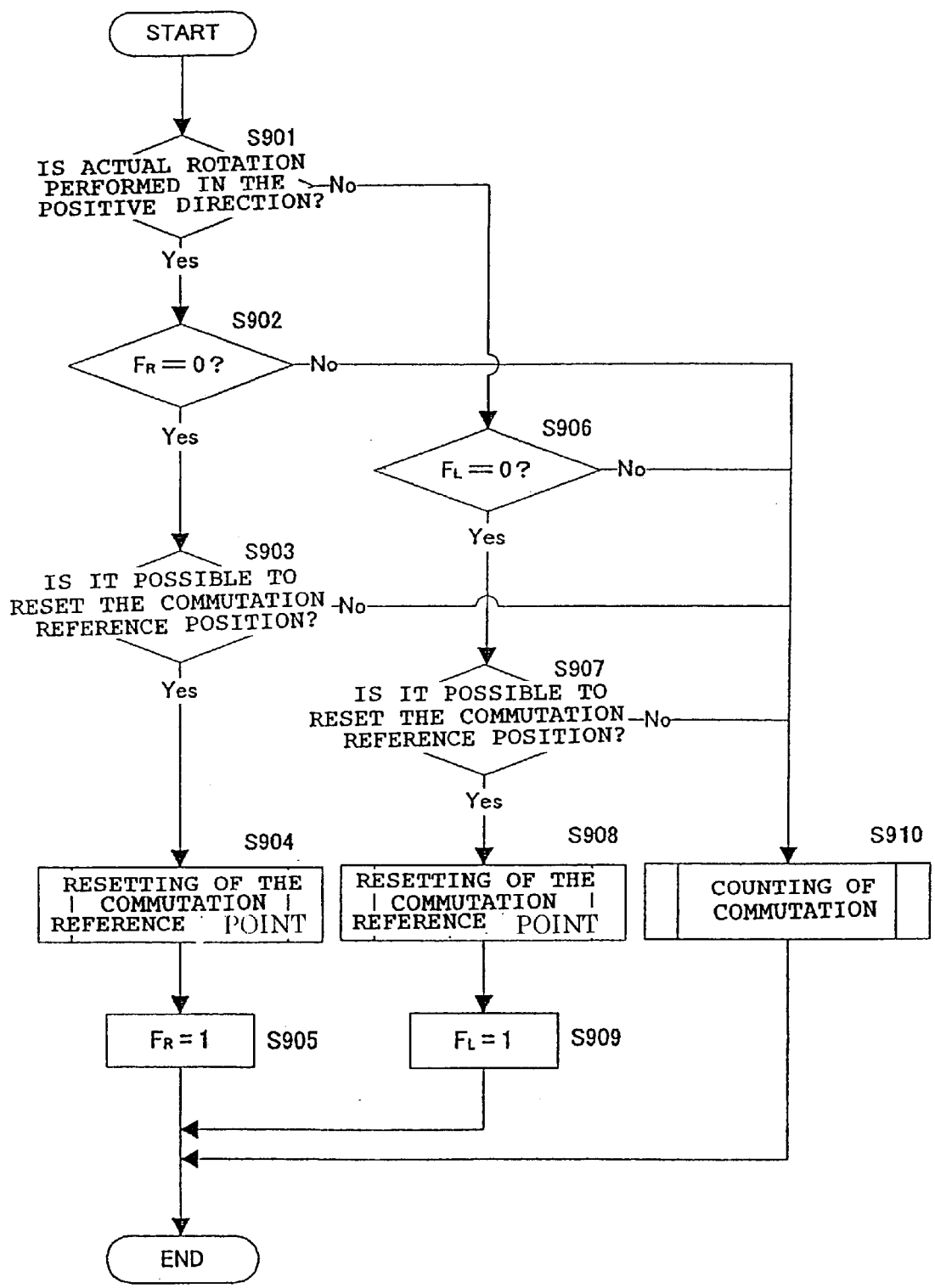
FIG. 12 is a flow chart illustrating an example of a commutation control routine shown in FIG. 2.

In the commutation control routine shown in FIG. 12, a forward-direction commutation reference point reset flag FR and a reverse-direction commutation reference point reset flag FL are referred to. FR has a value of "1" when resetting of the commutation reference point used in rotation in the forward direction has been completed, while FR has a value of "0" if the resetting is not completed. FL has a value of "1" when resetting of the commutation reference point used in rotation in the reverse direction has been completed, while FL has a value of "0" if the resetting is not completed. In the first start operation, both FR and FL are set to "0". First, in step S901, it is determined whether the rotation of the brushless motor 1 is presently in the forward direction. If the rotation is in the forward direction, the routine goes to step S902. However, if the rotation is in the reverse direction, the routine goes to step S906. In the case where the rotation is in the forward direction, it is determined in step S902 whether the value of FR is equal to "0". If the value of FR is equal to "0", that is, if the resetting of the forward-direction commutation reference point is not completed, the routine goes to step S903. In step S903, it is determined whether the resetting of the commutation reference point is possible in the same or a similar manner as is described in the second embodiment. In the case where the resetting of the commutation reference point on the basis of the counter electromotive voltage is not possible because the rotational speed of the brushless motor 1 is low, the routine goes from step S903 to step S910 to perform the commutation counting routine shown in FIG. 11. In the commutation counting routine executed in step S910, the details of which are shown in FIG. 11, commutation mode switching in step S809 and step S821 is performed, as opposed to the commutation counting routine executed in step S711 shown in FIG. 10 (the details of which are shown in FIG. 11) in which such commutation mode switching is not performed. That is, each time an edge of a pulse is detected the count values CR and CL are incremented or decremented, depending upon the actual rotational direction, and, in the case where the rotation is in the forward direction, each time the value of CR becomes equal to "PnR", the commutation mode is switched, while in the case where the rotation is in the reverse direction, each time the value of CL becomes equal to "0", commutation is performed. The routine shown in FIG. 11 is similar to that executed in step S711 shown in FIG. 10 except that steps S809 and S821 are performed differently, the routine is not described in further detail again.

When the rotational speed of the brushless motor 1 has increased to a level high enough to detect a counter electromotive force, the routine goes from step S903 to step S904, and resetting of the commutation reference point for use in the forward rotation is performed. The resetting of the commutation reference point is performed in a similar manner to the commutation reference point resetting routine described above with reference to the second embodiment in conjunction with FIG. 9. However, when a commutation timing is generated (steps S601 to S606) and the commutation reference point is reset at a point of time corresponding to a delay of one-half of one commutation interval with respect to the zero-crossing of the counter electromotive voltage, the variable n used in steps S608 to S610 to specify a particular element Pn of the commutation pulse sequence P is replaced with the variable nR for use in the forward rotation, and the count value C in step S611 is replaced with the count value CR. Thereafter, the routine goes from step S904 to step S905 in FIG. 12, and the value of FR is set to "1" to indicate that resetting of the commutation reference point for use in forward rotation has been completed.

In the case where it is determined in step S901 that the rotation is in the reverse direction, the routine goes to step S906, and it is determined whether the value of FL is equal to "0". If the value of FL is equal to "0", that is, if resetting of the commutation reference point for use in reverse rotation is not completed, the routine goes to step S907. In step S907, as in step S903, it is determined whether the resetting of the commutation reference point is possible. If the resetting of the commutation reference point on the basis of the counter electromotive voltage is not possible, the routine goes from step S907 to S910, and the commutation counting routine shown in FIG. 11 is performed. In the case where the resetting of the commutation reference point is possible, the routine goes from step S907 to step S908, and the commutation reference point resetting routine shown in FIG. 9 is performed in a similar manner in step S904. However, the variable n used in steps S613 to S615 in FIG. 9 is replaced with the variable nL for use in reverse rotation, and the count value C in step S616 is replaced with the count value CL for use in reverse rotation. After completion of the commutation reference point resetting routine, the routine goes to step S909, and the value of FL is set to "1" to indicate that resetting of the commutation reference point has been completed.

In the following operation after the commutation reference points for use in forward and reverse rotation have been reset on the basis of the counter electromotive voltage and the values of FR and FL are set to "1", each time a pulse edge is detected in FIG. 2 (steps S104→S105), the routine goes from step S902 or S906 to step S910 in FIG. 12, and the commutation counting routine shown in FIG. 11 is performed.

In the third embodiment, as described above, commutation reference points are separately provided for use in forward and reverse rotation, and the commutation reference points are reset respectively at commutation timings determined on the basis of the counter electromotive voltage. Thus, in addition to advantages similar to those obtained in the second embodiment, a further advantage is that it is possible to eliminate the setting error of the commutation reference point, which occurs when one commutation reference point for both directions is set with respect to the same commutation timing, due to a difference in the hysteresis between forward and reverse directions and due to backlash which occurs when the rotational direction is switched.

In the third embodiment described above, the count value CR in the forward direction obtained when the count value CL in the reverse direction is set to "0" or PnL in step S714 or S715 in FIG. 10 may be employed as a reference point error $\Delta C$, and the count value CR may be used in both directions while shifting the commutation reference point by adding or subtracting the reference point error $\Delta C$ to the count value CR each time the rotational direction is switched.

Figure 13:
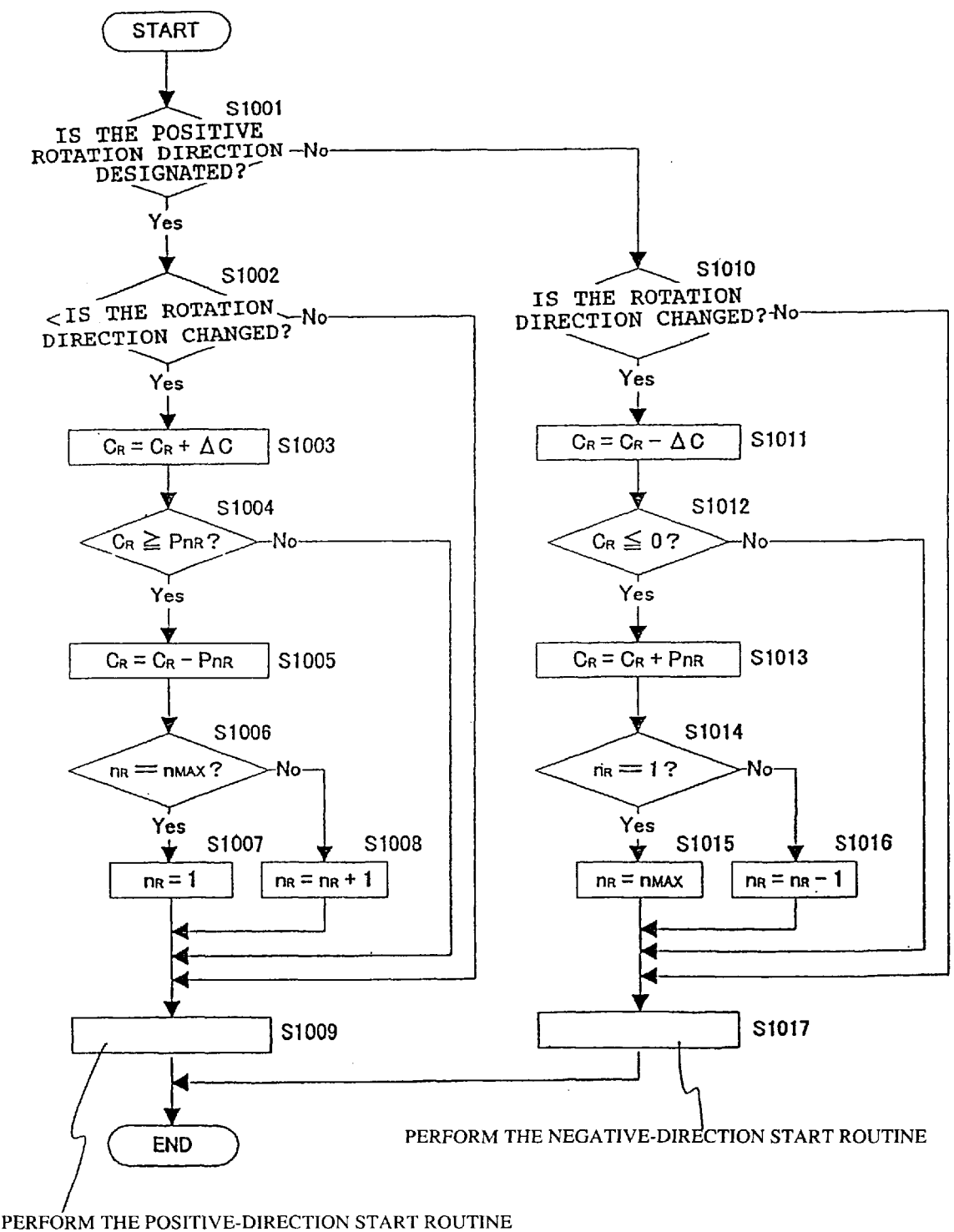
FIG. 13 is a flow chart illustrating an example of a start routine shown in FIG. 2.

In this case, the start routine in step S103 shown in FIG. 2 is performed in a manner as shown FIG. 13. That is, in a first step S1001 in the start routine shown in FIG. 13, it is determined which rotational direction is specified by the higher-level device. If the forward direction is specified, the routine goes to step S1002. In step S1002, it is determined whether the specified rotational direction is opposite to an immediately previous rotational direction. If the specified rotational direction is the same as the immediately previous rotational direction, that is, if the rotation should be still in the forward direction as in the immediately previous operation, the routine goes from step S1002 to step S1009 to perform a forward-direction start routine. On the other hand, if the specified rotational direction is opposite to the immediately previous direction, that is, in the case where the rotational direction should be changed from the reverse direction in the forward direction, the routine goes from step S1002 to step S1003, and the reference point error $\Delta C$ is added to the count value CR. Thereafter, the routine goes to step S1004 to determine whether the count value CR is equal to or greater than "PnR". If the count value CR is smaller than "PnR", the routine goes to step S1009. However, if the count value CR is equal to or greater than "PnR", the routine goes to step S1005, and "PnR" is subtracted from the value of CR. Thereafter, the routine goes to step S1006. In step S1006, it is determined whether the variable nR is equal to nMAX. If nR=nMAX, the routine goes to step S1007, and nR is set to nR=1. However, if nR is not equal to nMAX, the routine goes to step S1008, and the value of nR is incremented. Thereafter, the routine goes to step S1009, and the forward-direction start routine is performed. Thereafter, the routine exits from the start routine shown in FIG. 13.

In the case where it is determined in step S1001 that the reverse direction is specified by the higher-level device, the routine goes to step S1010. In step S1010, it is determined whether the specified rotational direction is opposite to the immediately previous rotational direction. If the specified rotational direction is the same as the immediately previous rotational direction, that is, if the rotation should be still in the reverse direction as in the immediately previous operation, the routine goes from step S1010 to step S1017 to perform a reverse-direction start routine. On the other hand, if the specified rotational direction is opposite to the immediately previous direction, that is, if the rotational direction should be changed from the forward direction to the reverse direction, the routine goes from step S1010 to step S1011, and the reference point error ΔC is subtracted from the value of CR. Thereafter, in step S1012, it is determined whether the count value CR is equal to or smaller than "0". If the count value CR is greater than "0", the routine goes to step S1017. However, if the count value CR is equal to or smaller than "0", the routine goes to step S1013, and "PnR" is added to the value of CR. Thereafter, the routine goes to step S1014. In step S1014, it is determined whether the variable nR is equal to "1". If nR=1, the routine goes to step S1015, and nR is set to nR=nMAX. However, if nR is not equal to "1", the routine goes to step S1016, and the value of nR decrements. Thereafter, the routine goes to step S1017 and the reverse-direction start routine is performed. Thereafter, the routine exits from the start routine shown in FIG. 13.

After the completion of the above process, the following commutation control can be performed simply by replacing the count value C with CR in the commutation counting routine shown in FIG. 6. That is, each time the rotational direction is switched, the count value CR is corrected by the reference point error ΔC, and thus the commutation counting routine can be performed in a simplified manner.

Although in the embodiments described above, the commutation timing of the motor used to move the paper feed mechanism is detected on the basis of the pulse signals output from the position detector disposed on the paper feed mechanism, the present invention is not limited to such a detection technique, but other position detection techniques may also be employed as long as the position detector can output the pulse signals in response to the movement of the object driven by the motor. Furthermore, a sensor such as a potentiometer may be used to detect the position of the object to be driven. In this case, a pulse generator is provided such that when the position information output from the potentiometer indicates that the object being driven has moved a predetermined distance, the pulse generator outputs a pulse, and controlling is performed in a manner similar to any one of the embodiments described above on the basis of the pulses output from the pulse generator thereby achieving advantages similar to those obtained in the embodiments described above.

In the embodiments described above, while the commutation is controlled on the basis of the pulse signals output from the position detector 15, the speed or the phase may also be controlled on the basis of these pulse signals output from the position detector 15.

Furthermore, although the present invention is applied to a DC brushless motor in the embodiments described above, the invention is not limited to DC brushless motors. The invention may also be applied to other types of motors such as a stepper motor. Still furthermore, although a linear encoder or a rotary encoder is employed as an a position detector in the embodiments described above, other types of encoders such as an optical encoder or a magnetic encoder may also be employed.

Still furthermore, although the invention is applied to a 3-phase brushless motor in the embodiments described above, the invention may also be applied to other types of brushless motors such as a single-phase motor, a 2-phase motor, a 4-phase motor, or motors having a greater number of phases.

In the embodiments described above, by way of example, the number of pulses over five commutation intervals is equal to "102", and thus the interval pulse number M is equal to "20.4". However, the number of pulses is not limited to such a specific value. For example, when the interval pulse number M is equal to $511/25=20.44$, if the rounded interval pulse number M' are determined in a similar manner as shown in Table 1, the difference between the rounded cumulative number of pulses and the real cumulative number of pulses becomes zero at the 25th commutation interval. That is, the error becomes zero every 25th commutation interval, and thus the commutation pulse sequence P can be formed of 25 elements. That is, when the interval pulse number M is an irreducible fractional number, the error of the rounded cumulative number of pulses with respect to the real cumulative number of pulses becomes zero when the commutation has been performed a number of times equal to the denominator of the irreducible fractional number. Therefore, any interval pulse number M may be employed as long as it can be represented in the form of a fractional number.

In the case where the interval pulse number M is an integer, commutation may be performed each time the count value C reaches the number of pulses per commutation interval.

Although in the embodiments described above, the commutation pulse sequence P is formed of rounded interval pulse numbers M' which are the differences between the rounded cumulative numbers of pulses in adjacent commutation intervals, the commutation pulse sequence P is not limited to that. For example, the commutation pulse sequence P may also be formed of the rounded cumulative numbers of pulses themselves. In this case, commutation is performed each time the count value C becomes equal to one of the rounded cumulative numbers of pulses, wherein, in the case where the count value C increases, the count value C is reset to 0 when the count value C reaches the maximum rounded number of pulses, while, in the case where the count value C decreases, the count value C is reset to the maximum rounded number of pulses when the count value C becomes equal to 0.

Still furthermore, although in the embodiments described above, the zero-crossing detection circuit 13 detects the counter electromotive force of one of phases and detects a zero-crossing on the basis of the detected counter electromotive force, the zero-crossing may be detected for all phases. However, there is no significant difference in accuracy between the zero-crossing detected for one phase and that detected for all phases, and thus detection for one phase is more advantageous in that the zero-crossing can be detected by simpler processing with a simpler construction.

In the embodiments described above, the resetting of the commutation reference point is performed when the rotational speed of the brushless motor 1 becomes high enough to detect zero-crossing. Alternatively, after the driver circuit 10 is activated, the brushless motor 1 may be rotated to perform the resetting the commutation reference point, and after completion of the resetting the commutation reference point, driving is performed in response to a command signal output from the higher-level device. Furthermore, the commutation reference point may be reset not only when the driver circuit 10 is started, but also in predetermined intervals of time after starting to drive the brushless motor 1 so as to eliminate the influence of a change in temperature caused by the driving of the brushless motor 1. This makes it possible to eliminate a commutation reference point error due to the temperature change. Instead of resetting the commutation reference point in predetermined intervals of time, the resetting may be performed when a predetermined period of time has elapsed and thus the change in temperature has reached an equilibrium state.

The resetting of the commutation reference point may also be performed each time the rotational speed of the brushless motor becomes high enough to generate the commutation timing after the brushless motor 1 is started.

A commutation reference point error ΔC may be measured and stored in a storage area such as a ROM in advance, and, after setting the commutation reference point for use in driving in one rotational direction, the count value C obtained with respect to that commutation reference point may be corrected on the basis of the commutation reference point error ΔC each time the rotational direction is switched.

As described above, the commutation reference point is set at a position at which the rotor finally stops after the rotor has been certainly rotated in a desired direction by means of three-times excitation, thereby ensuring that when the sensorless motor is started in the same direction as the direction in which the rotor was finally rotated to the position at which the commutation reference point was set, commutation is performed accurately with respect to the resultant commutation reference point without encountering an influence of backlash.

Commutation reference points are set for the respective rotational directions so as to prevent commutation timings from shifting from the correct timings depending upon the switching of the rotational direction. Herein, if the offset value is set so as to represent the shift, in units of the number of pulses, of commutation timing which occurs when the rotational direction is switched, one of the commutation reference points can be used in both rotational directions. In this case, the counted number of pulses is corrected on the basis of the offset value each time the rotational direction is switched. This makes it unnecessary to provide two count variables for storing the counted numbers of pulses in the respective directions, and also makes it unnecessary to switch the count variable each time the rotational direction is switched.

When it becomes possible to generate a commutation timing on the basis of the counter electromotive force induced in non-exciting phase, the position of the rotor is detected more precisely on the basis of the counter electromotive force, and a commutation timing is generated and resetting of the commutation reference point is performed on the basis of the detected position of the rotor, thereby ensuring that commutation is controlled more precisely. The commutation timing is generated on the basis of the counter electromotive force not of all phases of the sensorless motor but of one of phases. This allows the counter electromotive force to be detected with a smaller number of circuits, and also allows the commutation timing to be generated by simpler processing.

The commutation timing generating means generates commutation timings for the respective rotational directions of the sensorless motor, and the commutation reference points for the respective rotational directions are reset at points of time of the respective commutation timings thereby preventing the commutation timings from shifting from the correct timings depending upon the direction of rotation. The offset value, which indicates the number of pulses corresponding to the difference in position between the commutation reference points set for the respective rotational directions of the sensorless motor, is detected. After resetting the commutation reference points, the number of pulses is counted with respect to one of the commutation reference points, and the count value of pulses is corrected on the basis of the offset value each time the rotational direction is switched, so that the corrected count value represents the number with respect to the commutation reference point corresponding to the actual rotational direction. This makes it unnecessary to provide two count variables for storing the counted numbers of pulses in the respective directions, and also makes it unnecessary to switch the count variable each time the rotational direction is switched. Furthermore, if the offset value is detected and stored in advance, it is unnecessary to detect the offset value each time the commutation reference point is reset on the basis of the commutation timing generated by the commutation timing generating means.

The resetting of the commutation reference point on the basis of the commutation timing generated by the commutation timing generating means is performed when the control of the sensorless motor is started. This makes it possible to precisely control commutation substantially immediately after starting the control of the sensorless motor. Furthermore, the resetting of the commutation reference point may be performed when a predetermined period of time has elapsed since the control of the sensorless motor was started, thereby eliminating the influence of the change in ambient temperature upon the commutation reference point. The resetting of the commutation reference point may also be performed in predetermined intervals of time after the control of the sensorless motor is started, thereby eliminating the influence of the change in ambient temperature upon the commutation reference point thus maintaining high accuracy of the commutation reference point. Furthermore, the resetting of the commutation reference point may also be performed each time the sensorless motor is started so that the commutation reference point is correctly set depending upon the conditions when the sensorless motor is started.

The entire disclosure of Japanese Patent Application 2001-088846, filed Mar. 26, 2001, is hereby incorporated by reference.

What is claimed is:

1. A sensorless motor driving apparatus comprising:
   a position detector for outputting a pulse signal in response to a movement of an object driven by a sensorless motor;
   a commutation control means which counts a number of pulses of the pulse signal output from the position detector and controls the commutation of the sensorless motor depending upon a count value; and
   a commutation reference point setting means for setting a commutation reference point employed as a reference point in the counting of the pulses;
   wherein, each time said sensorless motor is started for the first time after the apparatus has been turned on, said commutation reference point setting means performs a first and a second phase excitation such that a first pulled-in position resulting from the first phase excitation and a second pulled-in position resulting from the second phase excitation become different in electrical angle from each other by a magnitude not equal to either 180° or an integral multiple of 180°, and said commutation reference point setting means further performs a third phase excitation such that a third pulled-in position resulting from the third phase excitation becomes different in electrical angle from the second pulled-in position by a magnitude not equal to either 180° or an integral multiple of 180°, and, thereafter, said commutation reference point setting means performs the setting of said commutation reference point when a rotor of said sensorless motor has stopped after said third phase excitation.

2. A sensorless motor driving apparatus according to claim 1, wherein the commutation reference point setting means sets the commutation reference point for each rotational direction of the sensorless motor, and wherein the commutation control means controls the commutation depending upon the respective rotational direction in accordance with the number of pulses as counted starting from the commutation reference point set for that respective direction.

3. A sensorless motor driving apparatus according to claim 2, wherein the commutation reference point setting means detects an offset value indicating the number of pulses corresponding to the difference in position between said commutation reference points set for the respective rotational directions of said sensorless motor, and wherein the commutation control means counts the pulses with respect to one of the commutation reference points and corrects the count value of pulses on the basis of the offset value each time the rotational direction is switched.

4. A sensorless motor driving apparatus according to claim 1, further comprising:
  a counter electromotive force detection means for detecting a counter electromotive force induced in a non-exciting phase of the sensorless motor; and
  a commutation timing generating means for generating a commutation timing in accordance with the counter electromotive force detected by the counter electromotive force detection means,
  wherein said commutation reference point setting means resets the commutation reference point at a point of time of the commutation timing generated by the commutation timing generating means.

5. A sensorless motor driving apparatus according to claim 4, wherein said commutation timing generating means generates a commutation timing in accordance with the counter electromotive force of one of the phases of said sensorless motor.

6. A sensorless motor driving apparatus according to claim 4, wherein the commutation timing generating means generates a commutation timing for each rotational direction of the sensorless motor, and wherein the commutation reference point setting means resets the commutation reference points for the respective rotational directions in accordance with the corresponding commutation timings generated for the respective rotational directions.

7. A sensorless motor driving apparatus according to claim 6, wherein said commutation reference point setting means detects an offset value indicating the number of pulses corresponding to the difference in position between the commutation reference points reset in accordance with the commutation timings generated for the respective rotational directions by said commutation timing generating means, and wherein said commutation control means counts the pulses with respect to one of said commutation reference points and corrects the count value of pulses on the basis of said offset value each time the rotational direction is switched.

8. A sensorless motor driving apparatus according to claim 7, further comprising storage means for storing said offset value, wherein said commutation control means corrects the count value of pulses in accordance with said offset value stored in the storage means.

9. A sensorless motor driving apparatus according to claim 4, wherein when the control of the sensorless motor is started, the commutation control means performs the resetting of a commutation reference point in accordance with a commutation timing generated by the commutation timing generating means.

10. A sensorless motor driving apparatus according to claim 4, wherein when a predetermined period of time has elapsed since the control of the sensorless motor was started, the commutation control means performs the resetting of a commutation reference point in accordance with a commutation timing generated by the commutation timing generating means.

11. A sensorless motor driving apparatus according to claim 4, wherein each time a predetermined period of time elapses after the control of the sensorless motor was started, the commutation control means performs the resetting of a commutation reference point in accordance with a commutation timing generated by the commutation timing generating means.

12. A sensorless motor driving apparatus according to claim 4, wherein each time the sensorless motor is started, the commutation control means performs the resetting of a commutation reference point in accordance with a commutation timing generated by the commutation timing generating means.

13. A method of controlling a sensorless motor driving apparatus including a brushless motor, an inverter, a commutation control circuit, and a position detector, the method comprising:
  controlling commutation of said brushless motor on the basis of pulse signals output from said position detector;
  performing an initial pulling-in operation in said commutation control circuit to serve as a reference point;
  performing a second pulling-in operation in said commutation control circuit such that a first pulled-in position is different from a second pulled-in position by a magnitude not equal to either 180° or an integral multiple of 180°; and
  performing a third pulling-in operation in said commutation control circuit such that said second pulled-in position is different from a third pulled-in position by a magnitude not equal to either 180° or an integral multiple of 180°
  setting said reference point when a rotor of said motor has stopped after said third pulling-in operation.

14. A method according to claim 13, wherein said third pulling-in operation can be performed in either a forward direction or a reverse direction.

15. A method according to claim 13, further comprising monitoring a counter electromotive voltage with a zero-crossing detection circuit; and
  generating a commutation timing on the basis of detecting the counter electromotive voltage and resetting the commutation reference point on the basis of the commutation timing.

* * * * *

UNITED STATES PATENT AND TRADEMARK OFFICE
CERTIFICATE OF CORRECTION

PATENT NO. : 6,570,351 B2
DATED : May 27, 2003
INVENTOR(S) : Shinichi Miyazaki and Akihiko Ikegami It is certified that error appears in the above-identified patent and that said Letters Patent is hereby corrected as shown below:

Title page,
Item [75], Inventor, "Ikegami," "Suwa (JP)" should be -- Okaya-shi (JP) --

Column 9,
Line 22, "p3" should be -- P3 --
Line 46, "chose" should be -- chosen --

Column 10,
Line 65, "nMax" should be -- nMAX --

Column 25,
Line 58, delete "an"

Signed and Sealed this

Ninth Day of March, 2004

JON W. DUDAS
*Acting Director of the United States Patent and Trademark Office*